United States Patent
Fan et al.

(10) Patent No.: US 11,646,035 B1
(45) Date of Patent: May 9, 2023

(54) DIALOG MANAGEMENT SYSTEM

(71) Applicant: Amazon Technologies, Inc., Seattle, WA (US)

(72) Inventors: Xing Fan, Redmond, WA (US); Chenlei Guo, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 17/027,903

(22) Filed: Sep. 22, 2020

(51) Int. Cl.
  *G10L 15/32* (2013.01)
  *G10L 15/07* (2013.01)
  *G10L 15/18* (2013.01)
  *G06F 16/9032* (2019.01)

(52) U.S. Cl.
  CPC ........ *G10L 15/32* (2013.01); *G06F 16/90332* (2019.01); *G10L 15/075* (2013.01); *G10L 15/1815* (2013.01)

(58) Field of Classification Search
  CPC ... G10L 15/32; G10L 15/075; G10L 15/1815; G06F 16/90332
  See application file for complete search history.

(56) References Cited

U.S. PATENT DOCUMENTS

| | | | | |
|---|---|---|---|---|
| 2018/0075131 | A1* | 3/2018 | Van Hoof | G06F 40/35 |
| 2019/0213999 | A1* | 7/2019 | Grupen | G06F 3/167 |
| 2020/0342850 | A1* | 10/2020 | Vishnoi | H04L 51/214 |
| 2020/0410986 | A1* | 12/2020 | Shen | G10L 15/1822 |
| 2021/0295203 | A1* | 9/2021 | Liao | G06F 40/30 |

FOREIGN PATENT DOCUMENTS

CN 110413752 A * 11/2019 ......... G06F 16/3329

* cited by examiner

*Primary Examiner* — Sonia L Gay
(74) *Attorney, Agent, or Firm* — Pierce Atwood LLP

(57) ABSTRACT

Techniques for determining an intent for a user input in a dialog are described. The system processes historic interaction data that is structured based skills and intents, with each skill-intent pair being associated with one or more past user inputs received by the system, one or more sample inputs, and one or more alternative representations of the user inputs. Based on processing of the historic interaction data and dialog data of previous turns of the dialog, the system determines potential intents for the user input of the current turn of the dialog. The potential intents may correspond to a presently active skill or another skill, enabling the user to interact with another skill during the dialog.

20 Claims, 16 Drawing Sheets

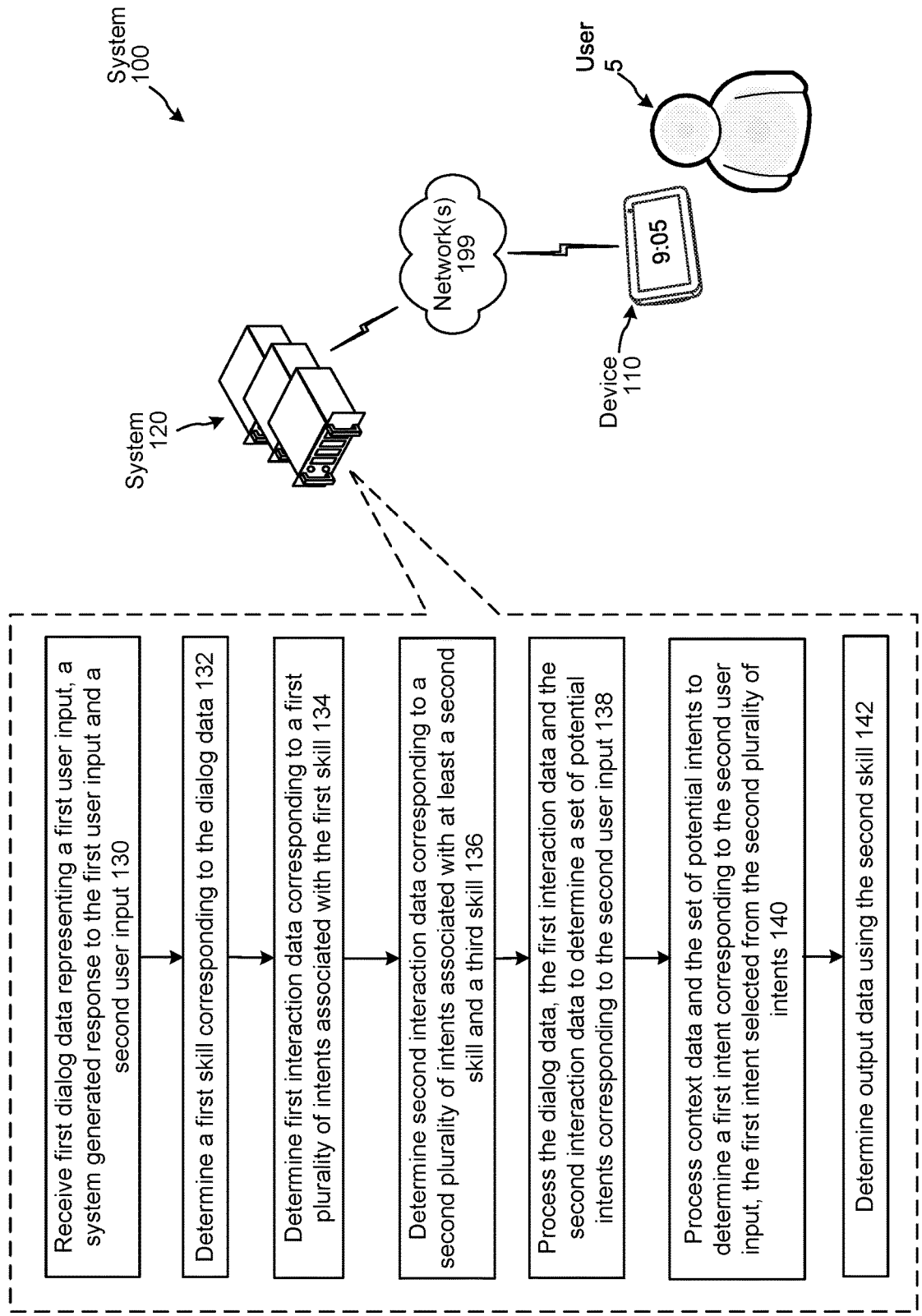

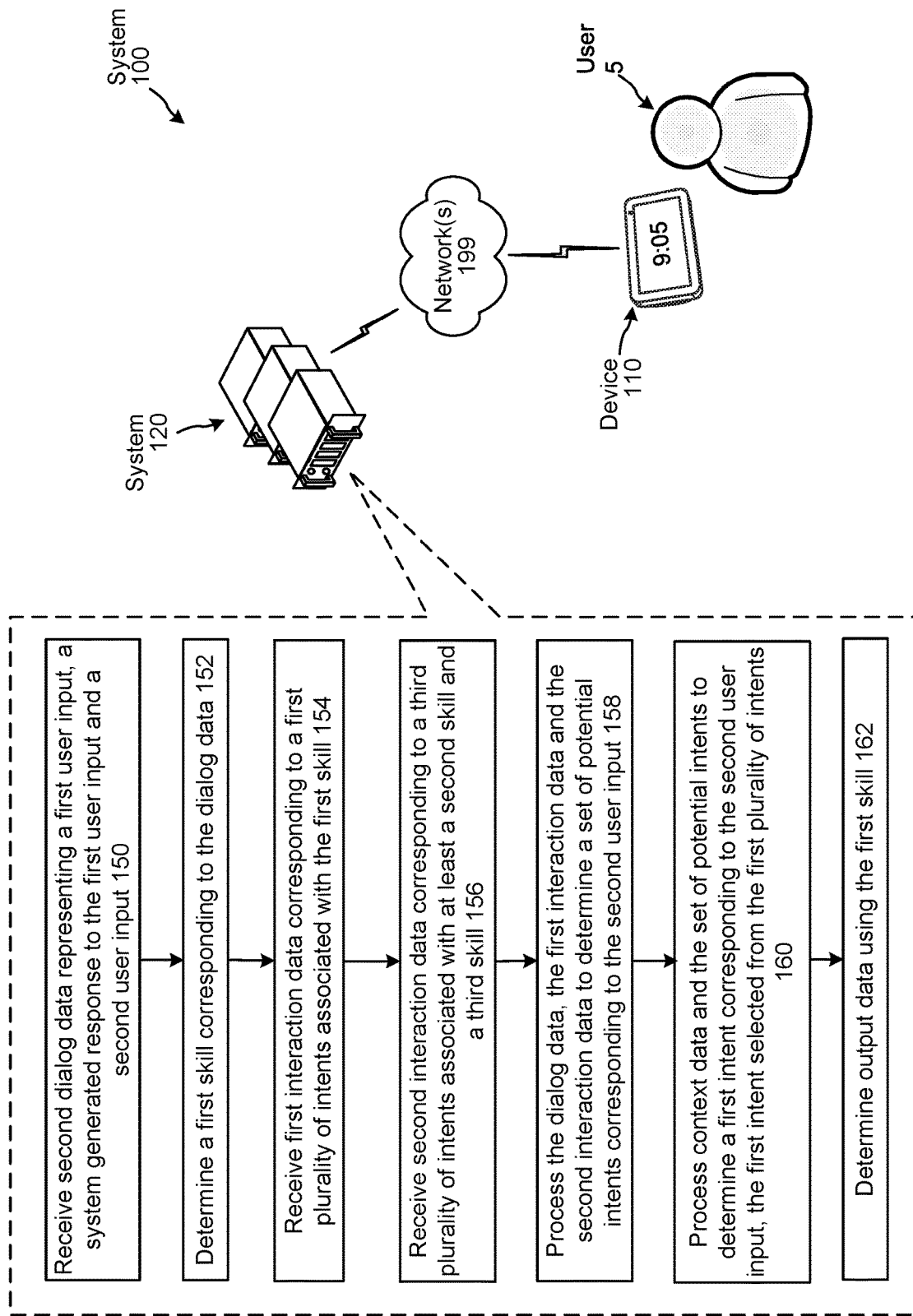

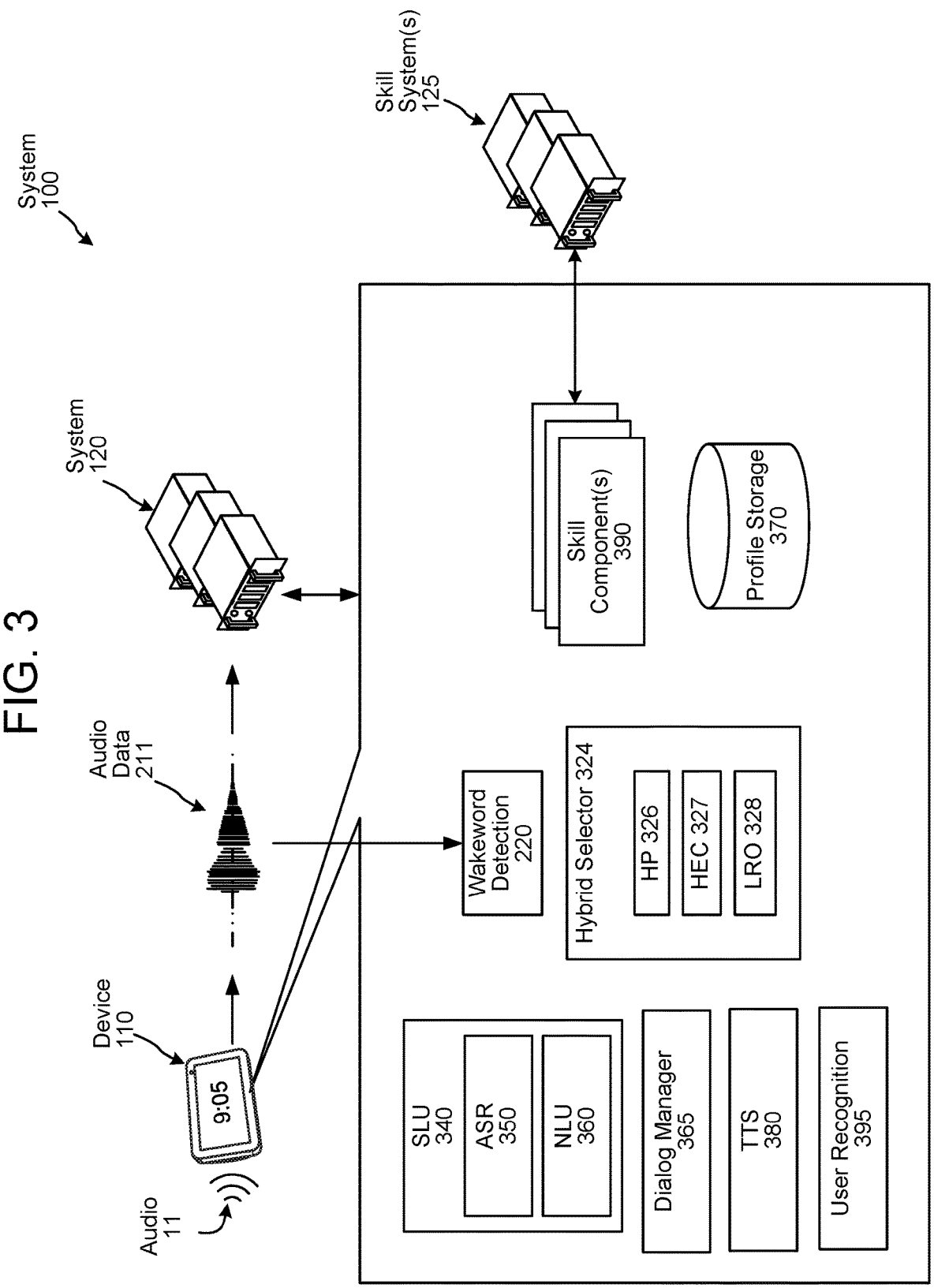

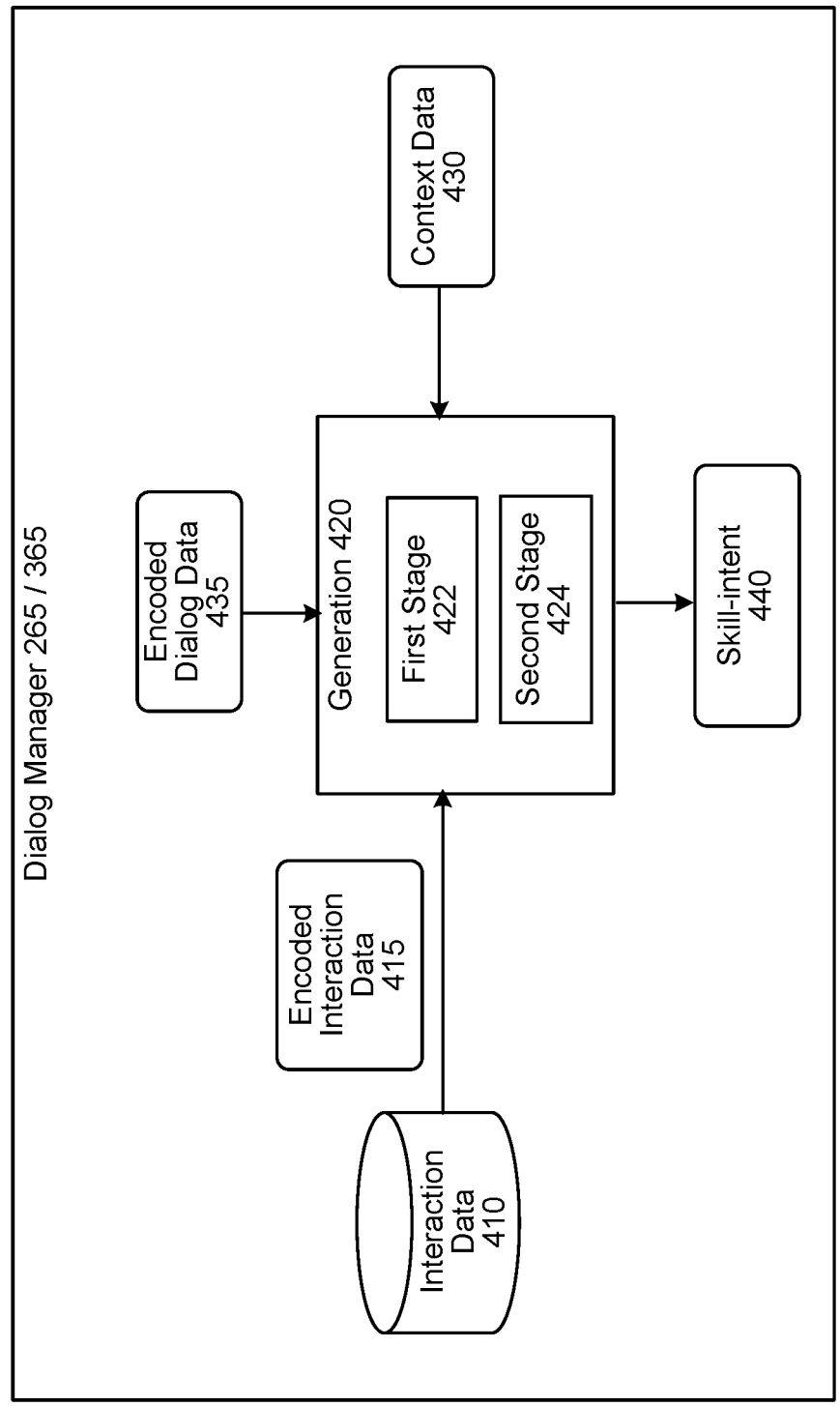

DIALOG MANAGEMENT SYSTEM

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are conceptual diagrams illustrating a system configured to arbitrate between a within-skill intent and out-of-skill intent for a turn of a dialog, according to embodiments of the present disclosure.

FIG. 3 is a conceptual diagram illustrating components that may be included in a device, according to embodiments of the present disclosure.

FIG. 4 is a conceptual diagram illustrating how a dialog manager may process data to determine a within-skill intent or out-of-skill intent corresponding to a user input in a dialog, according to embodiments of the present disclosure.

DETAILED DESCRIPTION

Figure 2:
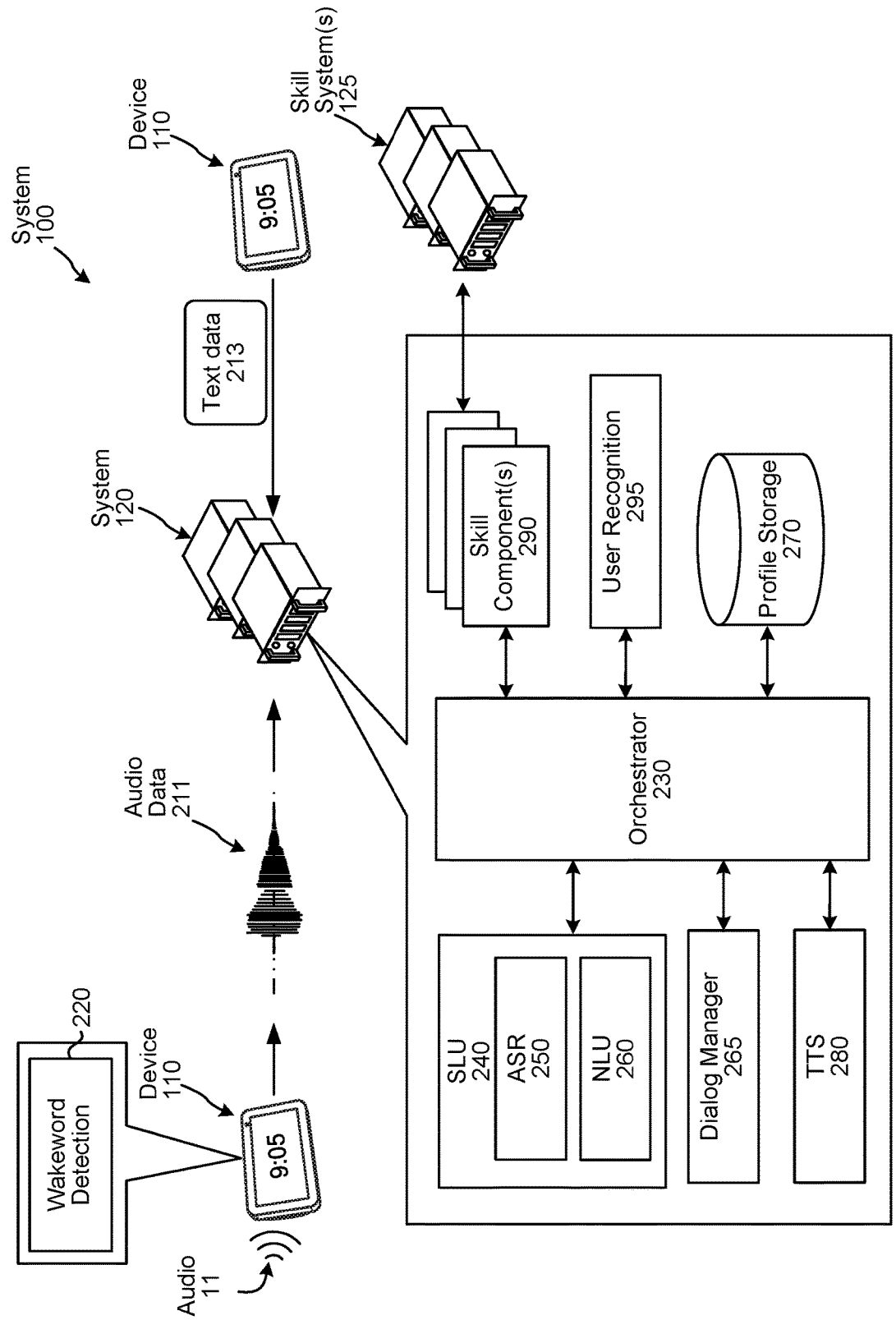
FIG. 2 is a conceptual diagram of components of a system, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) component of a system. Text-to-speech (TTS) is a field of computer science concerning transforming textual and/or other data into audio data that is synthesized to resemble human speech.

Certain systems may be configured to perform actions responsive to user inputs. For example, for the user input of "Alexa, play music by <Artist>," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may also be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action responsive to the user input (a system-generated response), may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the dialog session identifier or other data to track the progress of the dialog to select system responses in a way that tracks the previous user-system exchanges, thus moving the dialog along in a manner that results in a desirable user experience.

The system may invoke a skill to respond to a user input. For example, to respond to the user input "play music" the system may invoke a music skill capable of outputting music for the user. Certain systems allow a user to switch between skills, but the user may have to explicitly end the interaction with the current skill before another skill is invoked. In the foregoing example, the user may say "stop playing music" or "cancel" to end the interaction with the music skill, and then say "start yoga studio" to invoke a yoga studio skill.

The present disclosure relates to techniques for arbitrating between responding to a user input during a dialog session using a presently active skill (invoked during a most-recent prior turn of the dialog session) or responding to the user input using another skill. The system may determine that the user input corresponds to an intent associated with the presently active skill (a "within-skill intent") or determine that the user input corresponds to an intent associated with another skill (an "out-of-skill intent"). As used herein, a skill may refer to an application or a component of an application included in a device (e.g., a smartphone, a speech-controlled device, a desktop, a laptop, a smart TV, or other devices).

The present disclosure also describes techniques to use an alternative representation of the user input to generate a responsive output, so that the output is a desired response to the user input. In some cases, a user input may be misinterpreted or there may be errors in processing the user input, causing the system to output an undesired response. In such cases, the system may use the alternative representation of the user input that is known to cause the system to output a desired response. The system of the present disclosure may determine such alternative representations using structured data associated with the skills.

The structured data may include data that is organized by intents and entities. The structured data may include, for each intent and entity(ies), one or more past user inputs, one or more sample inputs (that may be provided by a skill developer), and one or more alternative representations of the past user inputs. The structured data may also indicate which skill(s) may process with respect to each intent and corresponding entity(ies).

The system of the present disclosure may employ two stages of processing to determine an intent associated with a user input during a dialog session. During the first stage, the system may retrieve potential intents (and entities) associated with the presently active skill (to evaluate a within-skill response), potential intents (and entities) associated with one or more other skills (to evaluate an out-of-skill response), and potential intents (and entities) associated with a group of skills that are similar to (by virtue of performing similar functionalities) the presently active skill. As such, the system retrieves potential intents corresponding to the user input from a diverse group of skills.

During the second stage of processing, the potential intents are processed in view of context data, corresponding to the dialog session, to select an intent (either a within-skill intent or an out-of-skill intent) to respond to the user input. The system may also determine to select an alternative representation of the user input to use in generating a response to the user input.

Aspects of the present disclosure improve the user experience by enabling a user to invoke multiple skills without explicitly ending the interaction with an active skill. Aspects of the present disclosure also reduces unsatisfactory user-system interactions by selecting an appropriate skill to respond to the user during a dialog.

FIGS. 1A and 1B illustrate a system 100 configured to determine an intent (from within-skill intents and/or out-of-skill intents) for a user input of a current turn in an on-going dialog. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include a device 110 (local to a user 5) in communication with a system 120 across one or more networks 199. The network(s) 199 may include a local or private network, or may include a wide network such as the Internet.

Referring to FIG. 1A, the system 120 receives (130) first dialog data representing a first user input, a system-generated response to the first user input, and a second user input for a dialog session. The dialog session may be an on-going dialog exchange between the user 5 and the system 120. The user 5 may provide one or more user inputs (e.g., spoken inputs, text-based inputs, or other forms of inputs corresponding to natural language inputs) during a dialog with the system 120. In response to a user input, the system 120 may output a system-generated response (e.g., a synthesized speech output, displayed text, or other form of output). During a first turn of the dialog, the user 5 may provide a first user input and the system 120 may output the system-generated response. During the second/current turn, the user 5 may provide the second user input, which may be evaluated by the system 120 according to FIG. 1A. The dialog data may include user inputs and system-generated responses for other prior turns of the dialog as well. The dialog data may include a representation of the first user input and the second user input, where the representations may be text data, token data, or other ASR output data.

The system 120 determines (132) a first skill corresponding to the dialog data. The system 120 may invoke the first skill during the dialog session to generate an output responsive to one or more user inputs provided in the dialog session. The first skill may be referred to as the presently active skill.

The system 120 determines (134) first interaction data corresponding to a first plurality of intents associated with the first skill. The first plurality of intents may be referred to as within-skill intents. The first interaction data may include, for each intent, a past user input(s), a sample input(s) (e.g., provided by a system/application/skill developer and representing an input that resolves to the particular intent and causes the system 120 to output a desired response), an alternative representation(s) for the user input(s), and system response(s) to the past user input(s). The first interaction data may be structured such that a first portion of the first interaction data corresponds to the first skill and a first intent associated with the first skill, and may include a first past user input associated with the first intent that was received by the system 120 from multiple different users, along with the number of times the past user input was received from multiple different users, and the number of times the past user input resulted in an undesired response for the multiple different users. The first portion may also include a first sample input corresponding to the first intent, a first alternative representation, a number of times the alternative representation was used by the system 120 for the multiple different users, a number of times the alternative representation resulted in an undesired response for the multiple different users, a first system response, a number of times the first system response was outputted for the multiple different users, and a number of times the first system response resulted in a undesired response for the multiple different users. A second portion of the first interaction data may correspond to a second intent associated with the first skill, and include similar data corresponding to the second intent. In some embodiments, the first interaction data may, instead or in addition to the foregoing, include user-specific data for the user 5 and may thus past user input(s) provided by the user 5, a number of times the past user input(s) was provided by the user 5, a number of times the past user input(s) resulted in a defect for the user 5, alternative representation(s) for the past user input(s) used for the user 5, a number of times the alternative representation(s) were used for the user 5, a number of times the alternative representation(s) resulted in a defect for the user 5, system response(s) outputted to the user 5, a number of times the system response(s) was outputted to the user 5, and a number of times the system response(s) resulted in a defect for the user 5.

The system 120 determines (136) second interaction data corresponding to a second plurality of intents associated with at least a second skill and a third skill. The second skill and the third skill may be different than the first skill, and the second plurality of intents may be referred to as out-of-skill intents. The second interaction data may include, for each intent, a past user input(s), a sample input(s) (e.g., provided by a system/application/skill developer and representing an input that resolves to the particular intent and causes the system 120 to output a desired response), an alternative representation(s) for the user input(s), and a system response(s) to the past user input(s). The second interaction data may be structured such that a first portion of the second interaction data corresponds to the second skill and an intent associated with the second skill, and may include a first past user input associated with the first intent that was received by the system 120 from multiple different users, along with the number of times the past user input was received from the multiple different users, and the number of times the past user input resulted in an undesired response for the multiple different users. The first portion may also include a first sample input corresponding to the first intent, a first alternative representation, a number of times the alternative representation was used by the system 120 for the multiple different users, a number of times the alternative representation resulted in an undesired response for the multiple different users, a first system response, a number of times the first system response was outputted for the multiple different users, and a number of times the first system response resulted in a undesired response for the multiple different users. A second portion of the second interaction data may correspond to an intent associated with the third skill, and include similar data as the first data. In some embodiments, the second interaction data may, instead or in addition to the foregoing, include user-specific data for the user 5 and may thus include past user input(s) provided by the user 5, a number of times the past user input(s) was provided by the user 5, a number of times the past user input(s) resulted in a defect for the user 5, alternative representation(s) for the past user input(s) used for the user 5, a number of times the alternative representation(s) were used for the user 5, a number of times the alternative representation(s) resulted in a defect for the user 5, system response(s) outputted to the user 5, a number of times the system response(s) was outputted to the user 5, and a number of times the system response(s) resulted in a defect for the user 5.

Figure 6:
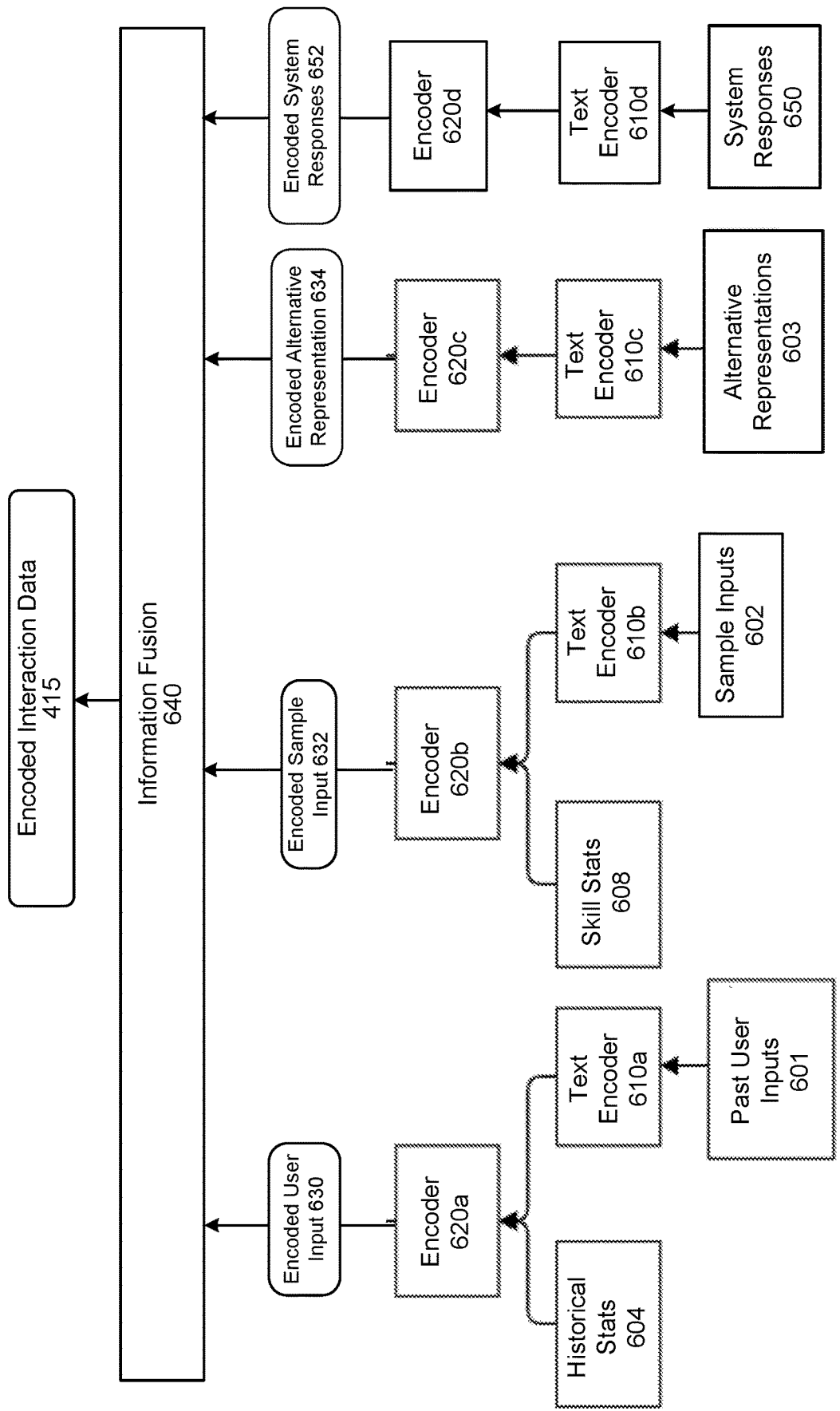
FIG. 6 is a conceptual diagram illustrating how encoded interaction data may be determined, according to embodiments of the present disclosure.

In some embodiments, the system 120 determines first encoded interaction data corresponding to the first interaction data and second encoded interaction data corresponding to the second interaction data, as described in detail with respect to FIG. 6. For example, the system 120 may process the first portion of the first interaction data using an encoder and process the second portion of the first interaction data using a same or different encoder. The encoded portions of the first encoded interaction data may be stored as the first encoded interaction data. Similar processing may be performed with respect to the second interaction data.

In some embodiments, the system 120 determines encoded dialog data. In some embodiments, the system 120 may determine encoded dialog data based on encoding each word/sub-word of the dialog data and data corresponding to each word. The word or sub-word may be represented by text data or by token data (determined by the ASR component 250). The data corresponding to each word may represent (1) an identity tag identifying whether the word corresponds to a user input or a system-generated response, (2) a turn tag identifying which turn of the dialog the word corresponds to, and (3) position data identifying where in the user input/system-generated response the word appears. In other embodiments, the system 120 may determine encoded dialog data based on encoding words of each dialog turn, and processing the encoded turn data to determine the encoded dialog data.

The system 120 processes (138) the dialog data, the first interaction data and the second interaction data to determine a set of potential intents corresponding to the second user input. The system 120 may process the encoded dialog data, the first encoded interaction data and the second encoded interaction data. The set of potential intents may include one or more intents from the first plurality of intents (within-skill intents) and/or one or more intents from the second plurality of intents (out-of-skill intents). In some embodiments, the system 120 may process the data as described with respect to FIG. 9.

The system 120 processes (140) context data and the set of potential intents to determine a first intent corresponding to the second user input, the first intent being selected from the second plurality of intents (out-of-skill intents). The context data may include device information (corresponding to the device 110), user information (corresponding to the user 5), location information corresponding to the device 110/user 5, and/or time information corresponding to when the dialog is taking place. Based on the context data, the system 120 may rank the set of potential intents, and select the highest ranking intent.

The system 120 determines (142) output data using the second skill associated with the second intent. In this example, the system 120 determines that an out-of-skill intent corresponds to the user input, and invokes a skill, other than the skill that is presently active, to respond to the second user input in the on-going dialog session.

Referring to FIG. 1B, the system 120 receives (150) second dialog data representing a first user input, a system-generated response to the first user input and a second user input. The dialog data may correspond to another dialog session between the user 5 and the system 120, and may include similar types of data as described with respect to step 130.

The system 120 may perform steps 152, 154, 156 and 158 in a similar manner, with respect to the dialog data of the current dialog session, as described above in relation to FIG.

1A and steps 132, 134, 136 and 138. The system 120 processes (160) context data (associated with the current dialog session) and the set of potential intents to determine a first intent corresponding to the second user input, the first intent being selected from the first plurality of intents (within-skill intents). The system 120 determines (162) output data using the first skill to respond to the second user input. In this example, the system 120 determines that an intent associated with the presently active skill corresponds to the user input of the current turn of the on-going dialog.

Other user inputs received by the system 120 may correspond to the device 110 including (or otherwise be associated with) a camera that captures a sequence of images representing the user 5 performing a gesture. The device 110 may send image data (representing the sequence of images) and/or an indication of the gesture performed to the system 120, and the system 120 may determine the gesture corresponds to a particular natural language user input. In a further example, the device 110 may include (or otherwise be associated with) a motion sensor configured to detect motion. When the device 110 detects motion, the device 110 may send data representing the detected motion to the system 120, and the system 120 may determine the detected motion corresponds to a particular natural language user input. In another example, the device 110 may include a button or display a virtual button, and the device 110 may detect the user 5 interacting with the button. The user 5 may interact with the button in various manners, such as a single quick press, a single long press, a double tap, a roaming touch input in a particular direction, etc. The device 110 may send data representing the detected button interaction to the system 120, and the system 120 may determine the button interaction corresponds to a particular natural language input.

A system may be configured to incorporate user permissions and may only perform activities disclosed herein if approved by a user. As such, the systems, devices, components, and techniques described herein are configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system, the device and/or user are located.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented using techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 220 to perform to determine when the user 5 intends to speak an input to the device 110. The device 110 may be configured to detect various wakewords. In at least some examples, each wakeword may correspond to a different digital assistant. In at least some examples, a wakeword may correspond to a name of a digital assistant. Example wakewords include, but are not limited to, Alexa, echo, Amazon, and computer.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 220 detects a wakeword, the device 110 may "wake" and begin transmitting audio data 211, representing the audio 11, to the system 120. The audio data 211 may include data corresponding to the detected wakeword, or the device 110*a* may remove the portion of the audio corresponding to the detected wakeword prior to sending the audio data 211 to the system 120.

The system 120 may include an orchestrator component 230 configured to receive the audio data 211 from the device 110. The system 120 may include a spoken language understanding (SLU) component 240 configured to perform spoken language processing. As used herein, spoken language processing may refer to NLU processing, or a combination of ASR processing and NLU processing. In some embodiments, the SLU component 240 may employ one or more ML models that are configured to process audio data and determine, directly from the audio data, the meaning of the user input (e.g., intent and slot data). In other embodiments, the SLU component 240 may include an ASR component 250 that is configured to process audio data to determine ASR data (e.g., text data or token data) representing what the user said, and a NLU component 260 that is configured to process the ASR data to determine NLU data (e.g., intent and slot data).

The orchestrator component 230 may send the audio data 211 to an ASR component 250 that transcribes the audio data 211 into ASR output data including one or more ASR hypotheses. ASR output data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The ASR output data (output by the ASR component 250) may be input to a NLU component 260. The NLU component 260 attempts to make a semantic interpretation of the phrase(s) or statement(s) represented in the ASR output data. That is, the NLU component 260 determines one or more meanings associated with the phrase(s) or statement(s) represented in the ASR output data based on words represented in the ASR output data. The NLU component 260 determines an intent representing an action that a user desires be performed as well as pieces of the spoken input that allow the device 110 (or other device), the system 120, a skill system 125, etc. to execute the intent. For example, if the ASR output data corresponds to "play Adele music," the NLU component 260 may determine a <PlayMusic> intent and may identify "Adele" as an artist. For further example, if the ASR output data corresponds to "what is the weather," the NLU component 260 may determine an <OutputWeather> intent. In another example, if the ASR output data corresponds to "turn off the lights," the NLU component 260 may determine a <DeactivateLight> intent. The NLU component 260 may output NLU output data (which may include one or more intent indicators that are each associated with one or more portions of tagged text data).

As described above, the system 120 may implement the SLU component 240 as two different components (i.e., the ASR component 250 and the NLU component 260). In at least some embodiments, the SLU component 240 may be implemented as a single component equivalent to a combination of the ASR component 250 and the NLU component 260. In such embodiments, the SLU component 240 may process the audio data 211 and directly generate NLU output data, without an intermediate step of generating ASR output data. As such, the SLU component 240 may take audio data 211 representing speech and attempt to make a semantic interpretation of the speech.

The system 120 may include one or more skill components 290. A skill component 290 may be software running on the system 120 that is akin to a software application running on a traditional computing device. That is, a skill component 290 may enable the system 120 to execute user commands involving specific functionality in order to provide data or produce some other requested output. A skill component 290 may operate in conjunction between the system 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components.

A skill component 290 may be configured to execute with respect to NLU output data. For example, for NLU output data including a <GetWeather> intent, the system 120 (and more particularly the orchestrator component 230) may invoke a weather skill component to determine and output weather information for a geographic location represented in a user profile or corresponding to a location of the user device 110 that captured the spoken input. For further example, for NLU output data including a <BookRide> intent, the system 120 (and more particularly the orchestrator component 230) may invoke a taxi skill component may book a requested ride. In another example, for NLU output data including a <BuyPizza> intent, the system 120 (and more particularly the orchestrator component 230) may invoke a restaurant skill component to place an order for a pizza. A skill component 290 may operate in conjunction between the system 120 and other devices, such as the device 110, restaurant electronic ordering systems, taxi electronic booking systems, etc. in order to complete certain functions.

A skill component 290 may be associated with a domain, a non-limiting list of which includes a smart home domain, a music domain, a video domain, a weather domain, a communications domain, a flash briefing domain, a shopping domain, and a custom domain.

The functionality described herein as a skill component 290 may be referred to using many different terms, such as an action, bot, app, application, or the like.

In at least some embodiments, a skill component 290 may perform an action by interacting with a skill system 125, which may include one or more databases, other software, and/or the like. For example, a skill component 290 may send an instruction to a skill system 125 to execute specific functionality in order to provide data or perform some other action requested by the user 5. In some examples, a skill component 290 may send a request for data (e.g., request for information) to a skill system 125 and may receive the requested data from the skill system 125, enabling the skill component 290 to perform an action requested by the user 5. In other examples, a skill component 290 may send an instruction to the skill system 125 and the skill system 125 may perform the action requested by the user 5. For example, a weather skill system may enable the system 100 to provide weather information, a car service skill system may enable the system 100 to book a trip with respect to a taxi or ride sharing service, a restaurant skill system may enable the system 100 to order a pizza with respect to the restaurant's online ordering system, etc.

The system 120 may communicate with a skill system 125 via Hypertext Transfer Protocol (HTTP) or HTTPS over one or more computer networks such as the network(s) 199, although the disclosure is not limited thereto. Communication between the system 120 and a skill system 125 may occur over one or more third-party network; that is, a computer network maintained by a provider not associated with the system 120 or the skill system 125 other than by use of the third-party network.

Additionally or alternatively, a skill component 290 may be implemented by a device 110. This may enable the device 110 to execute specific functionality in order to provide data or perform some other action requested by the user 5. The device 110 can host a skill component 290 in the form of an application executing on the device 110. Such a device 110 can be, for example, a mobile device 110 on a mobile network or a local area network (LAN).

The system 120, skill system 125, and/or device 110 may each host or otherwise execute instances of same or different skills. In some cases, a single skill—for example, a music skill— may have instances executing on more than one of the system 120, skill system 125, and/or device 110. For example, a skill system 125 may host a default instance of a skill while a device 110 hosts a personal instance of the skill. The personal instance of the skill may be a skill instance under development or test on a machine local to and/or operated by a skill developer. In another example, the system 120 may host a default instance of a skill while the device 110 hosts a personal instance of the skill in the form of an application executing on the device 110.

The system 120 may include a TTS component 280 that generates audio data (e.g., synthesized speech) from text data using one or more different methods. Text data input to the TTS component 280 may come from a skill component 290, a skill system 125, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to spoken inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 290/skill systems 125 that the user has enabled. When a user enables a skill component 290/skill system 125, the user is providing the system 120 with permission to allow the skill component 290/skill system 125 to execute with respect to the user's spoken inputs. If a user does not enable a skill component 290/skill system 125, the system 120 may not invoke the skill component 290/skill system 125 to execute with respect to the user's spoken inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data (such as input/output capabilities). A device profile may also include one or more user identifiers, corresponding to one or more user profiles associated with the device profile. For example, a household device's profile may include the user identifiers of users of the household.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language user input, to stored biometric data of users. The user recognition component 295 may additionally or alternatively perform user recognition by comparing image data (e.g., including a representation of at least a feature of a user), received by the system 120 in correlation with a natural language user input, with stored image data including representations of features of different users. The user recognition component 295 may perform other or additional user recognition processes, including those known in the art. For a particular natural language user input, the user recognition component 295 may perform processing with respect to stored data of users associated with the device 110 that captured the natural language user input.

The user recognition component 295 determines whether a natural language user input originated from a particular user. For example, the user recognition component 295 may generate a first value representing a likelihood that a natural language user input originated from a first user, a second value representing a likelihood that the natural language user input originated from a second user, etc. The user recognition component 295 may also determine an overall confidence regarding the accuracy of user recognition processing.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill, as well as processing performed by other components of the system 120 and/or other systems.

The system 120 may also include a dialog manager 265 configured to track a dialog between the user 5 and the system 120, including, for example, the user input and corresponding system-generated response for each turn. The dialog manager 265 may associate a dialog session identifier with the user inputs and system-generated responses during a dialog session. User inputs may be determined to be part of the same dialog session based on the time elapsed between the user inputs, based on the time elapsed between the system-generated response and a subsequent user input, and/or based on other data corresponding to the user 5/the device 110. The dialog manager 265, in some embodiments, may also be configured to arbitrate between within-skill and out-of-skill of intents for user inputs, as described in relation to FIG. 4.

The foregoing describes illustrative components and processing of the system 120. In at least some embodiments, the device 110 may be configured to include some or all of the components, and perform some or all of the processing of the system 120 described above. FIG. 3 illustrates the system 100 as it may be configured to include a device 110 capable of performing speech processing and sensitive data processing. Optimizing the utilization of on-device computing resources (e.g., processing resources, etc.) of the device 110, in at least some situations, can reduce latency so that the user experience with the device 110 is not negatively impacted by local processing tasks taking too long.

In general, the device 110 may be capable of capturing utterances with a microphone(s) and responding in various ways, such as by outputting content (e.g., audio) via an output device(s), which may be loudspeaker(s), a display(s), or any other suitable output component. In addition, the device 110 may be configured to respond to user speech by controlling one or more other devices that are co-located in an environment with the device 110, such as by sending a command to a second device via an input/output communications interface (e.g., a short range radio), the command instructing an operation to be performed at the second device (e.g., to turn on/off a smart light in the environment).

In addition to using a built-in microphone(s) to capture spoken inputs and convert them into digital audio data, a first device 110a may additionally or alternatively receive audio data from a second device 110b in the environment, such as when the second device 110b captures a spoken input from the user 5 and sends the audio data to the first device 110a. This may occur in situations where the second device 110b is closer to the user 5 and would like to leverage the processing capabilities of the first device 110a.

The device 110 may operate in conjunction with and/or under the control of a remote, network-based or network-accessible control system (e.g., the system 120). The system 120 may, in some examples be part of a network-accessible computing platform that is maintained and accessible via one or more network(s) 199 such as a wide area network. Network-accessible computing platforms such as this may be referred to using terms such as "on-demand computing", "software as a service (SaaS)", "platform computing", "network-accessible platform", "cloud services", "data centers", and so forth. The system 120 may be configured to provide particular functionality to large numbers of local (e.g., in-home, in-car, etc.) devices 110 of different users. The network(s) 199 is representative of any type of public or private, wide-area network, such as the Internet, which extends beyond the environment of the device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110 and other local devices (located in the same environment as the device 110) may be connected to a private network associated with the environment (e.g., home, business, etc.), and the devices may communicate with the network(s) 199 via the private network.

In at least some embodiments, the system 120 may be configured to receive the audio data 211 from the device 110, to recognize speech corresponding to a spoken input in the received audio data 211 using a SLU component 240 (which may be referred to as a speech processing system), and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to the user 5's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining a NLU result (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the on-device language processing component 340 (in which case the system 120 and the on-device language processing component 340 may process the audio data 211 in parallel, or at least partially in parallel, although the disclosure is not limited thereto). The wakeword detection component 220 may also send an indication, to the hybrid selector 324, representing a wakeword was not detected. In response to receiving such an indication, the hybrid selector 324 may refrain from sending the audio data 211 to the system 120, and may prevent the on-device language processing component 340 from further processing the audio data 211. In this situation, the audio data 211 can be discarded.

The device 110 may conduct its own speech processing using on-device language processing components, such as an ASR component 350 and an NLU 360, similar to the manner discussed above with respect to the ASR component 250 and the NLU component 360 of the system 120. The device 110 may also internally include, or otherwise have access to, other components such as one or more skill components 390 capable of executing commands based on NLU results or other results determined by the device 110, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 125.

As used herein, "skill" may refer to the skill component 290 or the skill system 125 or a combination of the skill component 290 and the skill system 125. As used herein, a skill may refer to an application or a component of an application included in a device 110.

The device 110 may also include a dialog manager 365 that may be similar to the dialog manager 265 described above with respect to FIG. 2.

In at least some embodiments, the on-device language processing components may not have the same capabilities as the language processing components of the system 120. For example, the on-device language processing components may be configured to handle only a subset of the spoken inputs that may be handled by the system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the system 120.

The hybrid selector 324, of the device 110, may include a hybrid proxy (HP) 326. The HP 326 can be implemented as a layer within a voice services component 322 and may be configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the on-device SLU component 340 about the availability of new audio data 211 that represents user speech, and to otherwise initiate the operations of the on-device SLU component 340 when new audio data 211 becomes available. In general, the hybrid selector 324 may control execution of the on-device SLU component 340, such as by sending "execute" and "terminate" events/instructions to the on-device SLU processing component 340. An "execute" event may instruct the local language processing component 340 to continue any suspended execution based on the audio data 211 (e.g., by instructing the on-device SLU component 340 to execute on a previously-determined intent in order to generate a directive). Meanwhile, a "terminate" event may instruct the on-device SLU component 340 to terminate further execution based on the audio data 211, such as when the device 110 receives directive data from the system 120 and chooses to use that remotely-generated directive data.

Thus, when the audio data 211 is received by the voice services component 322, the HP 326 may allow the audio data 211 to pass through to the system 120 and the HP 326 may also input the audio data 211 to the on-device SLU component 340 by routing the audio data 211 through the HEC 327 of the hybrid selector 324, whereby the LRO 328 notifies the on-device SLU component 340 of the incoming audio data 211. At this point, the hybrid selector 324 may wait for response data from either or both of the system 120 or the on-device SLU component 340. However, the disclosure is not limited thereto, and in some examples the hybrid selector 324 may send the audio data 211 only to the on-device SLU component 340 without departing from the disclosure. For example, the device 110 may process the audio data 211 locally without sending the audio data 211 to the system 120.

The on-device SLU component 340 is configured to receive the audio data 211 from the hybrid selector 324, to recognize speech in the audio data 211, to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the on-device SLU component 340 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The SLU component 340 may process the audio data 211 to determine local NLU output data, which may include intent data and/or slot data, so that directives may be determined based on the intent data and/or the slot data. Thus, the SLU component 340 may process the audio data 211 and attempt to make a semantic interpretation of the spoken input represented by the audio data 211 (e.g., determine a meaning associated with the spoken input) and then implement that meaning. For example, the SLU component 340 may interpret the spoken input, in the audio data 211, in order to derive an intent or a desired action or operation from the user 5. This may include deriving pertinent pieces of information from the spoken input that allow the SLU component 340 to identify a second device in the environment, if the user, for example, intends to control a second device (e.g., a light in the user 5's house). The on-device SLU component 340 may also provide a dialog management function to engage in speech dialogue with the user 5 to determine (e.g., clarify) intents by asking the user 5 for information using synthesized speech prompts.

In at least some embodiments, the SLU component 340 may output a single NLU hypothesis determined to most likely representing the spoken input in the audio data 211. Alternatively, in at least some embodiments, the SLU component 340 may output multiple NLU hypotheses in the form of a lattice or an N-best list, with individual NLU hypotheses corresponding to respective confidence values or other values (such as probability values, etc.). In at least some embodiments, the SLU component 340 may be customized to the user 5 (or multiple users) who created a user account to which the device 110 is registered. For example, the SLU component 340 may process the audio data 211 based on known information (e.g., preferences) of the user 5, and/or on a history of previous interactions with the user 5.

NLU output data, as determined by the device 110 and/or the system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU results (e.g., NLU output data generated by the device 110) may be evaluated with regard to confidence data for another set of results (e.g., NLU output data generated by the system 120).

Thus, an NLU hypothesis may be selected as usable to respond to the spoken input, and the on-device SLU component 340 may send local response data (e.g., local NLU output data and/or local directive data) to the hybrid selector 324, such as a "ReadyToExecute" response, which can indicate that the on-device SLU processing component 340 has recognized an intent, or is ready to communicate failure (e.g., if the on-device SLU component 340 could not recognize an intent). The hybrid selector 324 may then determine whether to use directive data from the on-device SLU component 340 to respond to the spoken input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each spoken input. The device 110 may include the unique identifier when sending the audio data 211 to the system 120, and the response data from the system 120 may include the unique identifier to identify which spoken input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill component 125 may be configured in a local environment (e.g., home server and/or the like) such that the device 110 may communicate with the skill component 125 via a private network [such as a local area network (LAN)].

In order to generate a particular interpreted response, the SLU component 340 may apply grammar models and lexical information associated with the respective skill component(s) 390 to recognize one or more entities in the spoken input. In this manner the language processing component 340 may identify "slots" (i.e., particular words in the spoken input) that may be needed for later command processing. Depending on the complexity of the SLU component 340, it may also label each slot with a type of varying levels of specificity (such as noun, place, city, artist name, song name, device name, or the like). Each grammar model used by the SLU component 340 may include the names of entities (i.e., nouns) commonly found in speech about the particular skill component 390 (i.e., generic terms), whereas the lexical information (e.g., from a gazetteer) is personalized to the user 5 and/or the device 110. For example, a grammar model associated with a navigation skill component may include a database of words commonly used when people discuss navigation.

Accordingly, the intents identified by the SLU component 340 may be linked to skill component-specific grammar frameworks with "slots" or "fields" to be filled (e.g., resolved). Each slot/field corresponds to a portion of the spoken input that the SLU component 340 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the SLU component 340 may parse the spoken input to identify words as subject, object, verb, preposition, etc., based on grammar rules and/or models, prior to recognizing named entities. The identified verb may be used by the SLU component 340 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The SLU component 340 may then search the corresponding fields in the skill component-specific and personalized lexicon(s), attempting to match words and phrases in the spoken input tagged as a grammatical object or object modifier with those identified in the database(s).

Various machine learning techniques may be used to train and operate models to perform various processes described herein, such as identifying sensitive data, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 4 is a conceptual diagram illustrating how the dialog manager 265/365 processes data to select between within-skill intents and out-of-skill intents for a user input during a dialog, according to embodiments of the present disclosure. As used herein, a skill may refer to an application or a component of an application included in a device 110, and a within-skill intent may refer to an intent/functionality of a presently active application, while an out-of-skill intent may refer to an intent/functionality of an application other than the presently active application. The dialog manager 265/365, in some embodiments, may include a generation component 420 that includes a first stage component 422 and a second stage component 424. The generation component 420 may process data for a present user input (and not for a previous user input/turn of the dialog) to determine whether the system 120 should present an output using the same skill as was invoked during the prior turn(s) of the dialog, or whether another skill should be used. In some cases, the generation component 420 may perform its functionalities after at least one skill is invoked during the dialog. An example dialog may be:

First turn:
User: "Tell me a joke"
System: "Ok, for which day?"
Second turn:
User: "Tuesday morning"
System: "Ok, flight is booked with confirmation number <number>"

In the foregoing example dialog, the system 120 may invoke a flight booking skill during the second turn (after receiving the second turn user input) and not during the first turn. In this case, the generation component 420 may perform its functionalities with respect to a user input received in the third turn (if any is received). In this example, the flight booking skill may be the presently active skill, and intents associated with the flight booking skill may be referred to as within-skill intents. Intents associated with skills other than the flight booking skill may be referred to as out-of-skill intents.

The generation component 420 is configured to process structured interaction data (e.g., stored at 410), dialog data (e.g., encoded dialog data 435), and context data (e.g., 430) to determine an intent, within-skill or out-of-skill, corresponding to a present user input in a dialog. The first stage component 422 may be considered a pre-filter component that determines top K potential intents from various levels of the interaction data based on the dialog data. The second stage component 424 may be considered a ranking or generation component that makes a final determination, using the top K potential intents, as to an intent corresponding to the present user input. The first stage component 422 and the second stage component 424 may be trained together using training data representing historical dialog session data that includes past user inputs and corresponding past system responses within a dialog session. The training data may include annotations indicating a respective intent for each past user input within the dialog sessions. As a negative sample, the training data may include one or more annotations indicating which intent(s) does not correspond to a particular past user input. Thus, the training data may indicate to the generation component 420 when to select a within-skill intent and when to select an out-of-skill intent.

The dialog manager 265/365 may include (or otherwise access) interaction data storage 410 storing interaction data corresponding to historic interactions between users and the system 120. The interaction data storage 410 may store indexed data that is organized by skills and intents. For example, the interaction data storage 410 may include a first document corresponding to a first skill and a first intent associated with the first skill. The interaction data storage 410 may store, for each instances of a skill and associated intent, one or more past user inputs received by the system 120. The interaction data storage 410 may also store the number of times each of the past user inputs was received by the system 120, and the number of times the past user input caused a defect. The interaction data storage 410 may also store one or more sample inputs for a given skill and associated intent. A sample input may be provided by a skill developer or administrator, and may represent an input that resolves to the associated intent and causes the system 120 to output a desired response. The interaction data storage 410 may also include one or more alternative representations of a given user input associated with a specific skill and intent pairing, the number of times each alternative representation was used to respond to the user input, and the number of times each alternative representation was a defect.

A defect may be caused when the system generates an undesired response to a user input due to, for example, system processing errors, misunderstanding what the user said, misunderstanding what the user meant, etc. For the user input "play my music," the undesired response by the system may be playing the wrong music, outputting "I am sorry I don't understand the request," or responding with silence. A sample input, included in the structured data, may represent an input corresponding to a skill and an intent, processing of which results in a desired response by the system.

An alternative representation of a user input may be determined by an alternative input component of the system 120. The alternative input component may be configured to process data representing the user input, such as, text data, token data or other ASR output data. The alternative input component, in some embodiments, determines the ASR output data is associated with a low confidence (e.g., a confidence score below a threshold value) and, based thereon, the alternative input component may determine an alternative representation for the user input. The alternative input component may use various techniques to determine the alternative representation including, but not limited to, probabilistic graphs, neural networks, encoder-decoder architecture with attention mechanisms, and others. The alternative input component may determine the alternative representation based on a user rephrasing an initial user input (and the rephrased input resulting in a desired response), user feedback data received in response to the initial user input and a rephrased user input, manually annotated user inputs, and other data. The alternative representation, in some cases, results in the system 120 outputting a desired response to the user input, while in other cases, the alternative representation may result in an undesired response.

Figure 5A:
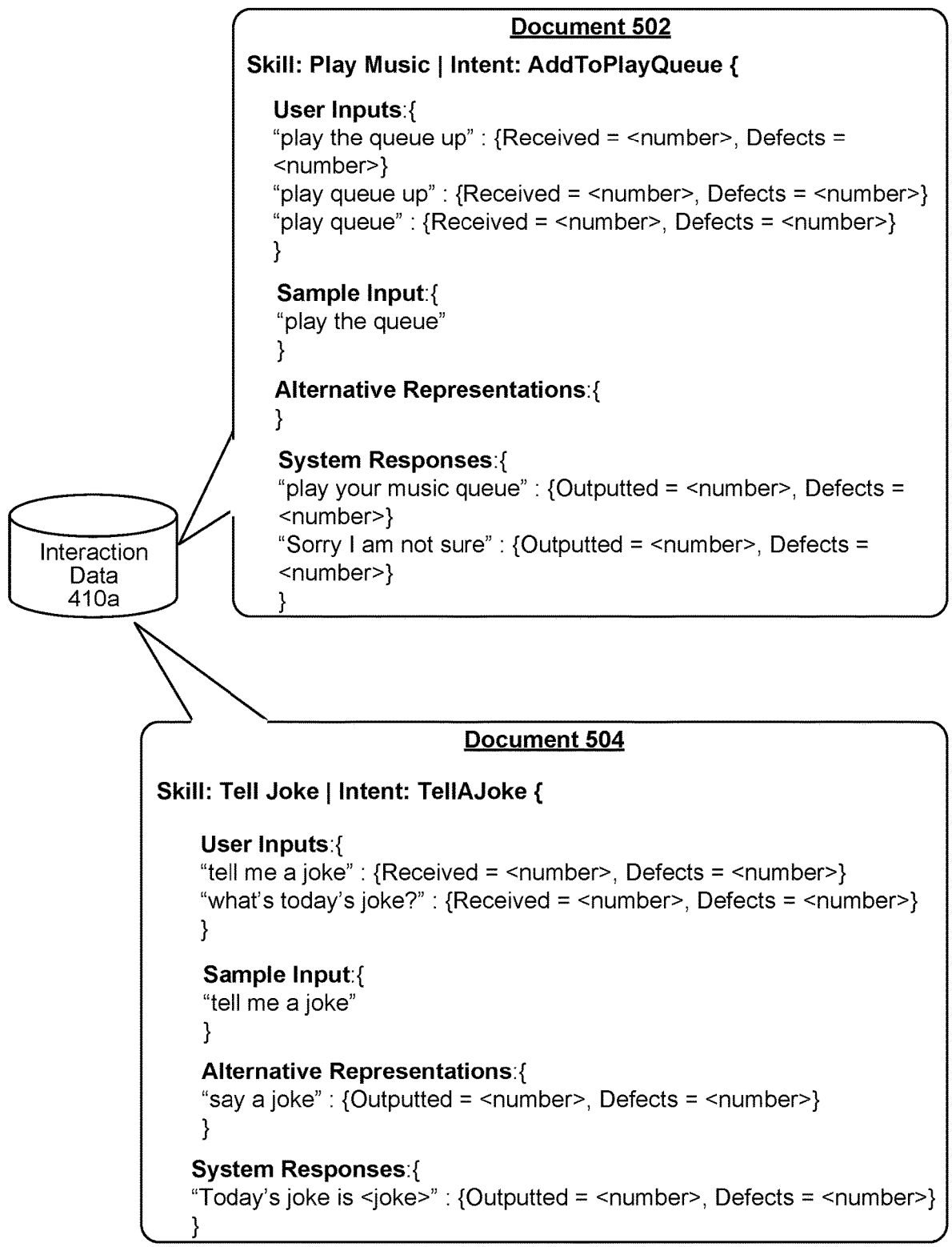
FIGS. 5A and 5B are conceptual diagrams illustrating example interaction data used by the dialog manager, according to embodiments of the present disclosure.
Figure 5B:
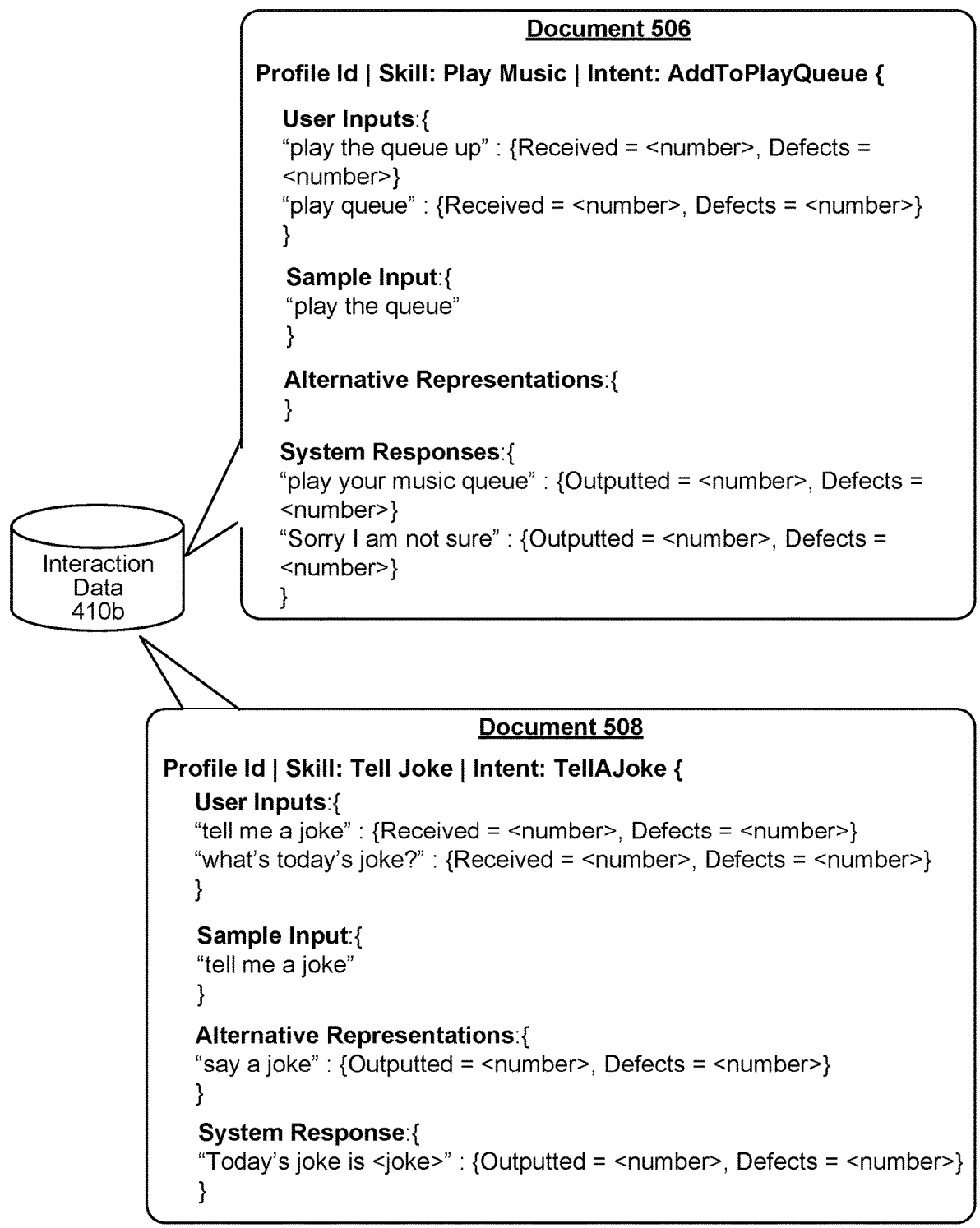

FIGS. 5A and 5B are conceptual diagrams illustrating example interaction data stored at the interaction data storage 410, according to embodiments of the present disclosure. The interaction data storage 410 may store a structured representation of past user inputs provided to the system 120 along with some metrics, sample inputs from skill developers, alternative representations of user inputs along with some metrics, and past system-generated responses with some metrics. A structured representation may be referred to as a document that corresponds to a particular skill and intent. The interaction data storage 410 may store multiple such documents, each corresponding to a different skill and associated intent. The interaction data storage 410 may store documents representing past user inputs from multiple different users and past system-generated responses provided to multiple different users. The interaction data storage 410 may also store user-specific documents (in a separate storage or labeled as such within the same storage) representing past user inputs from the specific user 5 and past system-generated responses provided to the specific user 5.

FIG. 5A illustrates example documents stored at the interaction data storage 410a corresponding to multiple different users. For example, shown in FIG. 5A is a first document 502 which may correspond to a first skill and a first intent associated with the first skill, in this case, [skill: play music|intent: AddToPlayQueue]. The document 502 includes one or more past user inputs received by the system 120, from multiple different users, that correspond to the first skill and first intent, along with the number of times each past user input was received from multiple different users and the number of times each past user input resulted in a defect for multiple different users. For example, a first past user input "play the queue up" was received <number> (e.g., 79 times), and resulted in a defect <number> (e.g., 10) times. The document 502 also includes one or more sample inputs, for example, "play the queue" that may be provided by a skill developer as an input that corresponds to the first skill and the first intent. In this case, there are no alternative representations of user inputs corresponding to the first skill and the first intent. The document 502 may also include system responses to multiple different users representing past system-generated responses (for example, "play your music queue" or "sorry I am not sure") to the past user inputs corresponding to the first skill and the first intent, along with the number of times the system responses were outputted and the number of times the system responses resulted in a defect for multiple different users.

A second document 504 at the interaction data storage 410*a*, may correspond to a second skill and a second intent associated with the second skill, for example, [skill: tell joke|intent: TellAJoke]. Similar to the first document, the second document 504 may include one or more past user inputs corresponding to the second skill and the second intent, along with the number of times each past user input was received and the number of times each past user input resulted in a defect. The document 504 may also include one or more sample inputs corresponding to the second skill and the second intent, and one or more alternative representations of one or more user inputs corresponding to the second skill and the second intent, along with the number of times each alternative representation was used for the multiple different users and the number of times each resulted in a defect for the multiple different users. For example, as shown, document 504 may include a first past user input "tell me a joke" that was received <number> (e.g., 21) times, and resulted in a defect <number> (e.g., 10) times. The document 504 may include a sample input "tell me a joke" and an alternative representation "say a joke" that was used <number> (e.g., 24) times and was a defect <number> (e.g., 10) times. The document 504 may also include system responses to multiple different users representing past system-generated responses (for example, "today's joke is <joke>") to the past user inputs corresponding to the second skill and the second intent, along with the number of times the system responses were outputted and the number of times the system responses resulted in a defect for multiple different users.

FIG. 5B illustrates example documents stored at the interaction data storage 410*b* corresponding to the specific user 5. For example, shown in FIG. 5B is a first document 506 which may correspond to a profile identifier of the user 5, a first skill and a first intent associated with the first skill, in this case, [skill: play music|intent: AddToPlayQueue]. The document 506 includes one or more past user inputs received by the system 120, from the user 5, that correspond to the first skill and first intent, along with the number of times each past user input was received from the user 5 and the number of times each past user input resulted in a defect for the user 5. For example, a first past user input "play the queue up" was received <number> (e.g., 10 times), and resulted in a defect <number> (e.g., 2) times. The document 506 also includes one or more sample inputs, for example, "play the queue" that may be provided by a skill developer as an input that corresponds to the first skill and the first intent. In this case, there are no alternative representations of user inputs corresponding to the first skill and the first intent. The document 506 may also include system responses to the user 5 representing past system-generated responses (for example, "play your music queue" or "sorry I am not sure") to the past user inputs corresponding to the first skill and the first intent, along with the number of times the system responses were outputted for the user 5 and the number of times the system responses resulted in a defect for the user 5.

A second document 508 at the interaction data storage 410*b*, may correspond to the profile identifier, a second skill and a second intent associated with the second skill, for example, [skill: tell joke|intent: TellAJoke]. Similar to the first document, the second document 508 may include one or more past user inputs from the user 5 corresponding to the second skill and the second intent, along with the number of times each past user input was received from the user 5 and the number of times each past user input resulted in a defect for the user 5. The document 504 may also include one or more sample inputs corresponding to the second skill and the second intent, and one or more alternative representations of one or more user inputs corresponding to the second skill and the second intent, along with the number of times each alternative representation was used for the user 5 and the number of times each resulted in a defect for the user 5. For example, as shown, document 508 may include a first past user input "tell me a joke" that was received <number> (e.g., 5) times from the user 5, and resulted in a defect <number> (e.g., 1) times for the user 5. The document 508 may include a sample input "tell me a joke" and an alternative representation "say a joke" that was used <number> (e.g., 2) times for the user 5 and was a defect <number> (e.g., 0) times for the user 5. The document 508 may also include system responses to the user 5 representing past system-generated responses (for example, "today's joke is <joke>") to the past user inputs corresponding to the second skill and the second intent, along with the number of times the system responses were outputted to the user 5 and the number of times the system responses resulted in a defect for the user 5.

In some embodiments, the document may also include, along with the skill and the intent, one or more entities corresponding to the skill and the intent.

Thus, the interaction data storage 410 includes (at least) three data types (i.e., past user inputs, sample inputs, and alternatively representations). Using the past user inputs in the data storage 410, the dialog manager 265/365 may determine an intent of a present user input in a dialog, where the intent may be within-skill or out-of-skill, by aligning the dialog data (representing one or more previous turns of the dialog) with historical interaction data, while considering a defects rate. The dialog manager 265/365 may align dialog data (representing one or more prior turn user inputs and the instant turn user input) with one or more intents represented in the interaction data storage 410 to determine potential (within-skill or out-of-skill) intents corresponding to the present user input of the instant dialog turn.

Referring to FIG. 4, encoded interaction data 415 may be provided to the generation component 420 for processing. The dialog manager 265/365 (or another component) may determine the encoded interaction data 415 (as described in relation to FIG. 6, which illustrates how the encoded interaction data 415 is determined, according to embodiments of the present disclosure). The encoded interaction data 415 may be determined prior to the system 120 receiving a user input for the instant dialog session. For example, the interaction data storage 410 may be updated on a periodic basis using user inputs received by the system 120 over a period of time. After the interaction data storage 410 is updated, the dialog manager 265/365 or another component may determine the encoded interaction data 415 as described below, and the interaction data storage 410 may store the encoded interaction data 415 for later use (for example, as part of the first stage 422 of processing). In other embodiments, the encoded interaction data 415 may be determined after a (first) user input for the instant dialog session is received. In some embodiments, the dialog manager 265/365 may use the same encoded interaction data 415 for processing as the dialog progresses and additional dialog turns take place.

The dialog manager 265/365 may determine the encoded interaction data 415 using an early fusion technique or a late fusion technique. FIG. 6 illustrates an example late fusion technique, where the three data types (past user inputs, sample inputs, alternative representations of user inputs and system responses) of the interaction data storage 410 are processed using separate encoders (620*a*, 620*b*, 620*c*, 620*d*), and the resulting encoded data are combined together to generate the encoded interaction data 415.

Referring to FIG. 6, text data, representing past user inputs 601 of a document, may be processed using a text encoder 610*a*. The text encoder 610*a* may be configured to generate word embeddings corresponding to the words in the past user inputs 601. The dialog manager 265/365 may process historical stats data 604 and the output of the text encoder 610*a* using an encoder 620*a*. The historical stats data 604 may correspond to the past user inputs, and may represent the number of times each of the past user inputs was received and the number of times each past user input resulted in a defect. The encoder 620*a* may be an embedding average model or a hierarchical attention model. The encoder 620*a* may be configured to combine the historical stats data 604 and the output of the text encoder 610*a* to generate encoded user input data 630.

Text data, representing the sample inputs 602 of the document may be processed using a text encoder 610*b*. The text encoder 610*b* may be configured to generate word embeddings corresponding to the words in the sample inputs. The dialog manager 265/365 may process skill stats data 608 and the output of the text encoder 610*b* using an encoder 620*b*. The skill stats data 608 may correspond to the skill associated with the document and the sample input. The skill stats data 608 may represent the number of times the skill was invoked/used by the system 120 to respond to user inputs for the corresponding intent. The skill stats data 608 may represent a number of users that have enabled the skill or subscribed to the skill. The skill stats data 608 may represent a rating (e.g., a satisfaction rating) representing different users' satisfaction/feedback with respect to the skill. The encoder 620*b* may be an embedding average model or a hierarchical attention model. The encoder 620*b* may be configured to combine the skill stats data 608 and the output of the text encoder 610*b* to generate encoded sample input data 632.

Text data, representing the alternative representations 603 of the document may be processed by a text encoder 610*c*. The text encoder 610*c* may be configured to generate word embeddings corresponding to the words in the alternative representations of the user inputs. The dialog manager 265/365 may process the output of the text encoder 610*c* using an encoder 620*c* to generate encoded alternative representation data 634. The encoder 620*c* may be an embedding average model or a hierarchical attention model. In some embodiments, the dialog manager 265/365 may also use the number of times the alternative representation was used and the number of the alternative representation resulted in a defect in determining the encoded alternative representation data 634.

Text data, representing the system responses 650 of the document may be processed by a text encoder 610*d*. The text encoder 610*d* may be configured to generate word embeddings corresponding to the words in the system responses. The dialog manager 265/365 may process the output of the text encoder 610*d* using an encoder 620*d* to generate encoded system responses data 652. The encoder 620*d* may be an embedding average model or a hierarchical attention model. In some embodiments, the dialog manager 265/365 may also use the number of times the system responses were outputted and the number of times the system response resulted in a defect in determining the encoded system responses data 652.

An information fusion component 640 may process the encoded user input data 630, the encoded sample input data 632, the encoded alternative representation data 634 and encoded system responses data 652. The information fusion component 620 may aggregate the various data 630, 632, 634 and 652 to generate the encoded interaction data 415. The information fusion component 620 may be a machine learning model (e.g., a neural network) configured to combine the various encoded data 630, 632, 634 and 652. In other embodiments, the information fusion component 620 may concatenate the various encoded data 630, 632 634, and 652 to determine the encoded interaction data 415.

The encoded interaction data 415 may correspond to the particular skill and intent of the document being processed and may correspond to multiple different users or the user 5. The dialog manager 265/365 may determine multiple different instances of the encoded interaction data 415, each corresponding to a different skill and intent associated with the skill. Some instances of the encoded interaction data 415 may correspond to multiple different users, and other instances of the encoded interaction data 415 may be user-specific and correspond to the user 5. For example, first encoded interaction data 415*a* may correspond to multiple different users, a first skill and first intent associated with the first skill (e.g., document 502), second encoded interaction data 415*b* may correspond to multiple different users, a second skill and a second intent associated with the second skill (e.g., document 504), third encoded interaction data 415*c* may correspond to multiple different users, the second skill and a third intent associated with the second skill, fourth encoded interaction data 415*d* may correspond to the user 5, the first skill and the first intent (e.g., document 506), and so on. The dialog manager 265/365 may determine encoded interaction data for each document/skill-intent pair represented in the interaction data storage 410.

Referring to FIG. 4, encoded dialog data 435 may be provided to the generation component 420 for processing. The dialog manager 265/365 (or another component) may determine the encoded dialog data 435 as described in relation to FIG. 7 or FIG. 8. Dialog data, used to determine the encoded dialog data 435, may include data representing user inputs and system-generated responses for the instant dialog between the user 5 and the system 120. The dialog data may represent data for one or more prior turns of the dialog that have taken place so far and the user input of the instant turn being evaluated by the generation component 420.

The dialog data may include tuple data corresponding to each word in a user input or a system-generated response, where the tuple data may include: (1) token data (determined by the ASR component 250 representing a word or a sub-word); (2) a turn tag (identifying a turn of the dialog); (3) an identity tag (identifying whether the word corresponds to a user input or a system-generated response); and (4) token position (identifying the position of the word within the user input or the system-generated response). In some embodiments, the token data may be a word embedding corresponding to a word or sub-word of the user input or the system-generated response.

For example, in the first turn if a user says "what time is it" and the system response is "it's nine am", the dialog data representation may be [("what", t1, user, pos_0), ("time", t1, user, pos_1), ("is", t1, user, pos_2), ("it", t1, user, pos_3), ("it's", t1, system, pos_0), ("nine", t1, system, pos_1), ("am", t1, system, pos_2)]. In some embodiments, the dialog data may also include the skill and intent corresponding to the user input associated with a turn tag. For example, for the user input "what time is it," the skill and intent included in the dialog data may be [t1, skill: time|intent:WhatTimeIntent].

Figure 7:
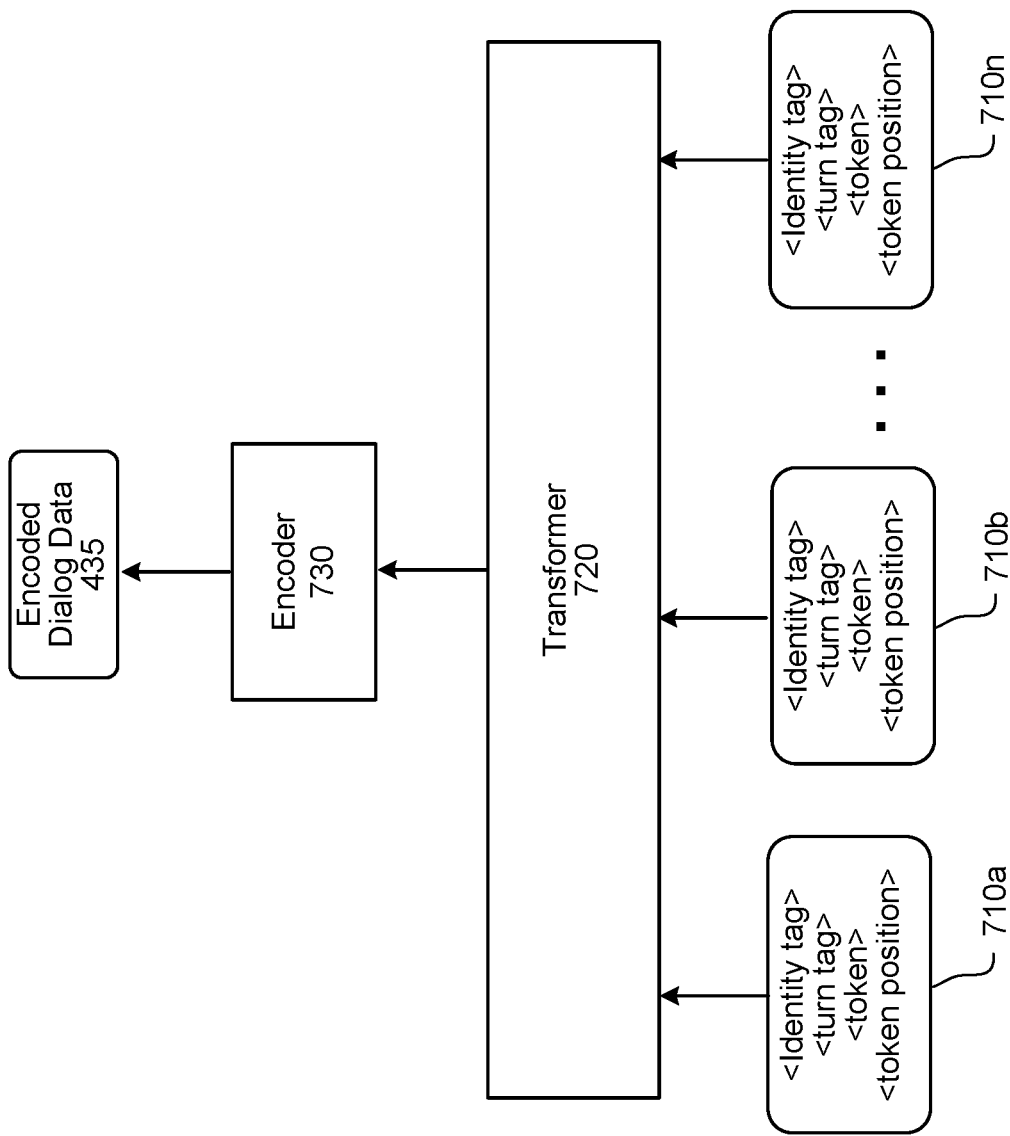
FIG. 7 is a conceptual diagram illustrating how encoded dialog data may be determined, according to embodiments of the present disclosure.

FIG. 7 is a conceptual diagram illustrating how encoded dialog data 435 is determined, according to embodiments of the present disclosure. Data 710 corresponds to particular words within the dialog data, and includes the tuple data described above. The order in which information is represented in the tuple data can vary. The data 710a may correspond to a first word of a user input during a first turn of the dialog, the data 710b may correspond to a first word of a system-generated response, and the data 710n may correspond to the last word of a user input during the Nth/last turn of the dialog, where the last turn is the one being evaluated by the generation component 420. An example dialog is as follows:

User (turn 1): "What is the time?"
System (turn 1): "It is nine am."
User (turn 2): "Ok, can you book me a taxi to work for pickup at 9:30 am?"

In the foregoing example, the data 710a may be {user, turn_1, "what", pos_0} and the data 710n may be {user, turn_2, "am", pos_14}. A transformer layer 720 may process the data 710. The transformer layer 720 may be a neural network or other type of machine learning model. A hidden representation of the data 710 is obtained from the transformer layer 720 and processed using an encoder 730 to generate the encoded dialog data 435. The encoder 730 may employ an averaging technique, a CNN and pooling layers, or an attention model to aggregate/combine the data 710 corresponding to each word in the dialog data.

Figure 8:
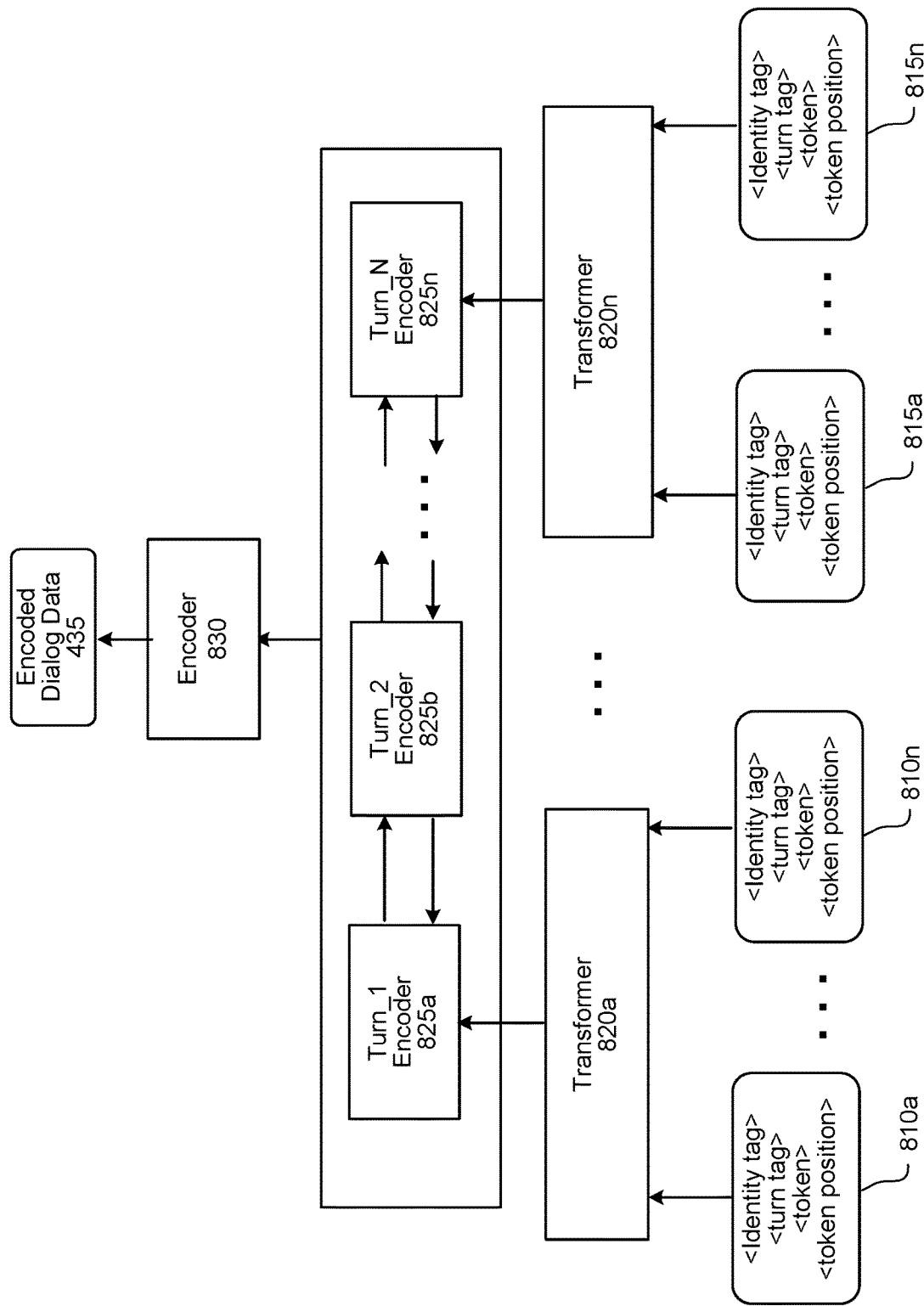
FIG. 8 is a conceptual diagram illustrating how encoded dialog data may be determined, according to other embodiments of the present disclosure

FIG. 8 is a conceptual diagram illustrating how encoded dialog data 435 is determined, according to other embodiments of the present disclosure. In this example, a hierarchical based technique may be used for encoding the dialog data. Data 810 corresponds to particular words of the first turn of the dialog, and data 815 corresponds to particular words of the Nth turn of the dialog that has taken place so far. The data 810a may correspond to a first word in a user input of the first turn of the dialog and the data 810n may correspond to the last word in a system-generated response of the first turn of the dialog. The data 815a may correspond to a first word in a user input of the last turn of the dialog, and the data 815n may correspond to the last word in the user input of the last turn of the dialog, where the last turn is the one being evaluated by the generation component 420. The data 810 and 815 may include the tuple data described above. Continuing with the foregoing example, the data 810a may be {user, turn_1, "what", pos_0}, the data 810n may be {system, turn_1, "am", pos_3}, the data 815a may be {user, turn_2, "ok", pos_0} and the data 815n may be {user, turn_2, "am", pos_14}.

In the example dialog above, the generation component 420 may evaluate the user input for the second turn to determine whether a within-skill intent or an out-of-skill intent corresponds to the user input. The system may invoke a time skill to respond to the user input in the first turn, and based on processing data, as described herein, the generation component 420 may determine to respond to the user in the second turn using a taxi skill and an intent associated with the taxi skill.

Referring to the embodiment of FIG. 8, dialog data for each turn may be processed using separate transformer layers 820. For example, the data 810 corresponding to the first turn of the dialog may be processed using the transformer layer 820a, and the data 815 corresponding to the Nth turn of the dialog may be processed using the transformer layer 820n. The hidden representations obtained from the transformer layers 820 may be processed by separate encoders 825 for each turn of the dialog. For example, the hidden representation from the transformer layer 820a may be processed by a turn_1 encoder 825a, the hidden representation from a transformer layer 820b (not shown) may be processed by a turn_2 encoder 825b, and the hidden representation from the transformer layer 820n may be processed by a turn N encoder 825n. Each encoder 825 may employ averaging techniques, CNN and pooling techniques or an attention model. The encoders 825 may be LSTMs and may share parameters and data with each other for context. An encoder 830 may aggregate or combine the outputs of the encoders 825 to generate the encoded dialog data 435.

The dialog manager 265/365 may determine the encoded dialog data 435 after receiving a user input once a skill is invoked for a turn. For example, the dialog manager 265/365 may determine first encoded dialog data 435 after a first turn of the dialog is complete where a first skill is invoked and a user input for a second turn is received. Using the first encoded dialog data 435, the generation component 420 may determine whether a within-skill intent or an out-of-skill intent corresponds to the user input of the second turn. After a system-generated response is determined/presented for the second turn and a user input for the third turn is received, the dialog manager 265/365 may determine second encoded dialog data 435, which may be used by the generation component 420 to determine whether a within-skill intent or an out-of-skill intent corresponds to the user input of the third turn, and so on.

Referring to FIG. 4, context data 430 may also be provided to the generation component 420 for processing. The context data 430 may include data representing device information for the device 110, from which the user input is received. The device information may include a device identifier, a device type, device capabilities (e.g., type of output the device 110 is capable of presenting), device profile information (e.g., whether the device 110 is configured for a child user), content output status (e.g., indicating whether the device 110 is presently outputting content, such as music, video, etc.), etc.

The context data 430 may additionally or alternatively include data corresponding to the user 5 that provided the user input and is engaged in the dialog with the system 120. The data corresponding to the user 5 may include data from profile storage 270, a user identifier, background information, user demographics, user preferences (e.g., a preference for one skill over another, music preferences, restaurant/food preferences, sporting team preferences, etc.), applications/skills enabled for the user 5/device 110, services the user 5 is subscribed to, etc.

The context data 430 may additionally or alternatively include location information for the location of the device 110 and/or the location of the user 5. The location information may be a geographic location (e.g., an address, GPS coordinates, etc.), and/or a user-defined location, such as, work, home, vacation home, car, school, etc.

The context data 430 may additionally or alternatively include time information corresponding to when the user 5 started the instant dialog with the system 120, the (current) time when the user input of the instant turn was received, the time when the user inputs of each turn of the dialog were received, etc. The time information may also represent the day (e.g., Monday), the week (e.g., $30^{th}$ week), the month (e.g., April), the year, the season (e.g., Fall), etc. for when the user 5 started the instant dialog.

The generation component 420 may be configured to process the encoded interaction data 415, the encoded dialog data 435 and the context data 430 to determine a skill and associated intent corresponding to the user input of the current turn of the dialog. The skill-intent data 440 may be provided to downstream components, for example, by the orchestrator 230/LRO 328. The skill-intent data 440 may include a skill identifier identifying with the skill associated with the intent, and may also include intent data representing the intent. The skill-intent data 440 may also indicate one or more entities corresponding to the current turn of the dialog. In some embodiments, the skill-intent data 440 may also include a system response corresponding to the skill and the intent based on the system responses in the document (e.g., 502, 504, 506 and 508). The downstream components may determine whether or not to use the skill and intent represented in the skill-intent data 440 to generate output data to present to the user 5 in response to the user input of the current turn. The downstream components may include a NLU merger component configured to merge NLU hypotheses/intents determined by various components of the system 120, such as the NLU component 260/360 and the dialog manager 265/365. The downstream components may include a post-NLU ranker configured to rank various NLU hypotheses/intents.

Figure 9:
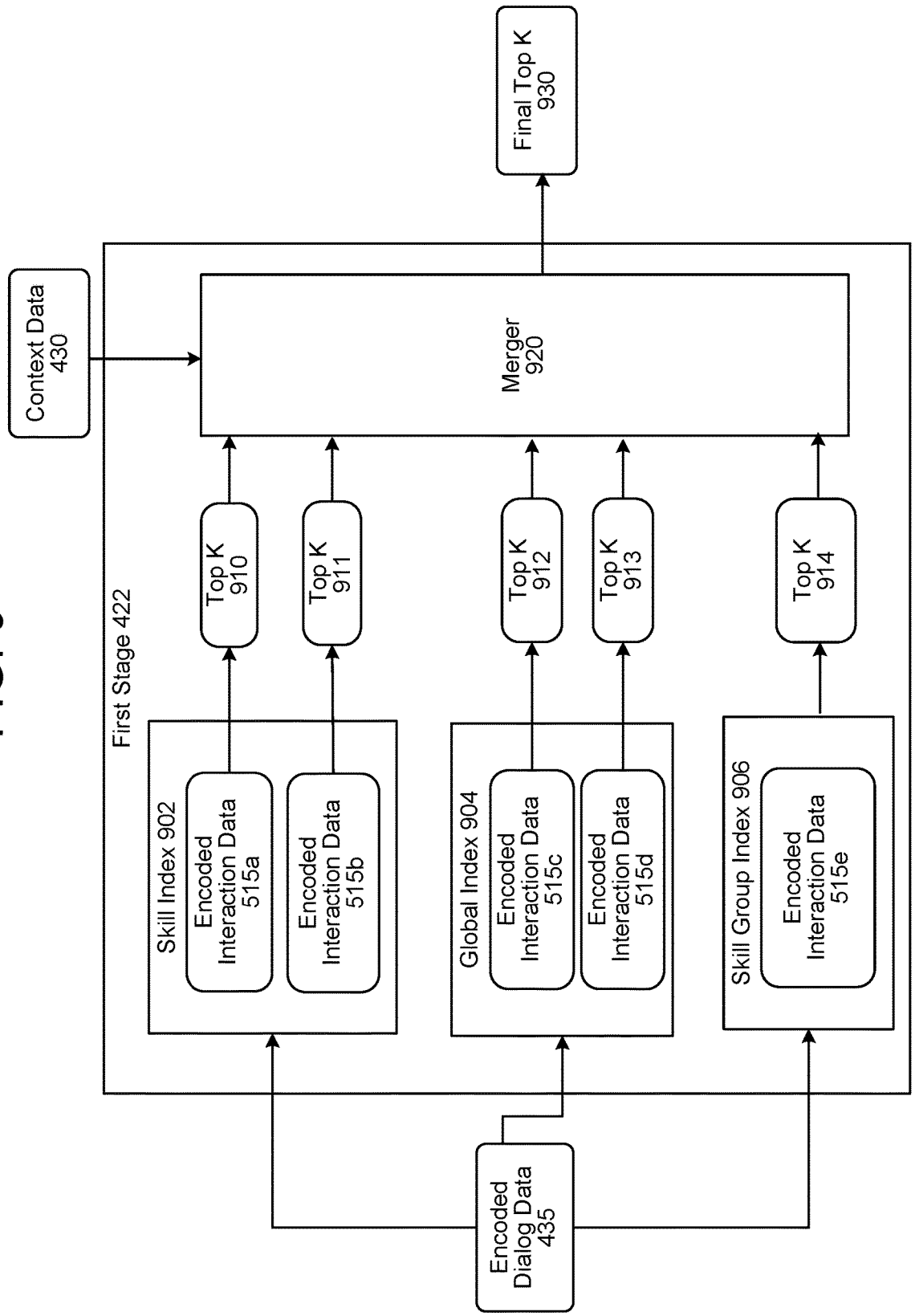
FIG. 9 is a conceptual diagram illustrating a first stage of processing to determine potential intents corresponding to a user input in a dialog, according to embodiments of the present disclosure.

FIG. 9 is a conceptual diagram illustrating a first stage of processing, performed by the first stage component 422 (of the generation component 420), to determine potential intents corresponding to the user input of the current turn, according to embodiments of the present disclosure. The first stage component 422 may process different types/levels of interaction data, including (1) skill level interaction data representing interactions between users (multiple different users and the user 5) and the presently active skill (invoked during the prior turn(s) of the dialog), (2) global level interaction data representing interactions between users (multiple different users and the user 5) and skills other than the presently active skill, and (3) skill group level interaction data representing interactions between users and a group of skills that are similar to the presently active skill (i.e., by virtue of the group of skills performing the same or substantially similar functionality as the presently active skill).

In some embodiments, the interaction data storage 410 may store interaction data relating to the different levels described above. For example, the interaction data storage 410 may store first interaction data corresponding to the skill level, second interaction data corresponding to the global level, and third interaction data corresponding to the skill group level. In other embodiments, there may be separate instances of the interaction data storage 410 storing interaction data corresponding to the different levels. For example, a first interaction data storage 410a may store interaction data corresponding to the skill level, a second interaction data storage 410b may store interaction data corresponding to the global level, and a third interaction data storage 410c may store interaction data corresponding to the skill group level.

The first stage component 422 may include separate components to process the different levels of interaction data in view of the encoded dialog data 435. A skill index component 902 may process the encoded dialog data 435 and the encoded interaction data 515a corresponding to multiple different users and the skill level to determine top K data 910 representing one or more within-skill intents that potentially correspond to the present user input. The skill index component 902 may process the encoded dialog data 435 and the (user-specific) encoded interaction data 515b corresponding to the user 5 and the skill level to determine (user-specific) top K data 911 representing one or more within-skill intents that potentially correspond to the present user input. The skill index component 902 may perform a neural semantic search or k-Nearest-Neighbor (kNN) processing to determine one or more inputs (past user inputs, sample inputs, alternative representations) within the documents, from the encoded interaction data 515a, 515b, that are semantically similar to the encoded dialog data 435. The skill index component 902 may be configured to minimize the cosine distance between the documents in the encoded interaction data 515a, 515b and the encoded dialog data 435.

The encoded interaction data 515a, 515b for the skill level may correspond to a presently active skill. Thus the documents in the encoded interaction data 515a, 515b may correspond to the same skill and may represent within-skill intents. The encoded interaction data 515a, 515b may be populated after a skill is invoked in the dialog session. The dialog manager 265/365 (or another component) may retrieve documents from the interaction data storage 410 corresponding to the invoked skill, and may generate the encoded interaction data 515a, 515b as described in relation to FIG. 6. The encoded interaction data 515a, 515b may be updated/repopulated after another skill is invoked in the dialog session, so that the encoded interaction data 515a, 515b corresponds to the presently active skill (and not the previously invoked skill). Thus, the encoded interaction data 515a, 515b may be determined after a dialog session begins and may be updated during the dialog session. The encoded interaction data 515a, 515b may thus correspond to a presently active skill at all times during the dialog session. In some embodiments, the skill index component 902 may also process encoded interaction data corresponding to a group of users that are similar to the user 5 (with respect to profile data, demographics, areas of interest, location, education background, employment, etc.).

A global index component 904 may process the encoded dialog data 435 and the encoded interaction data 515c corresponding to multiple different users at the global level to determine top K data 912 representing one or more potential intents corresponding to the present user input in the dialog. The global index component 904 may process the encoded dialog data 435 and the (user-specific) encoded interaction data 515d corresponding to the user 5 at the global level to determine (user-specific) top K data 913 representing one or more potential intents corresponding to the present user input in the dialog. The global index component 904 may perform a neural semantic search or kNN processing to determine one or more inputs (past user inputs, sample inputs, alternative representations) in the documents, from the encoded interaction data 515c, 515d that are semantically similar to the encoded dialog data 435. The global index component 904 may be configured to minimize the cosine distance between the interaction data 515c, 515d and the encoded dialog data 435. In some cases, the (user-specific) top K data 913 may be based on skills that are enabled for the user 5 (skills that the user 5 is subscribed to use). In some cases, the (user-specific) top K data 913 may represent skills/intents that the user 5 prefers to use.

The encoded interaction data 515c, 515d may correspond to all available skills for the system 120, in some embodiments, including the presently active skill. In other embodiments, the encoded interaction data 515c, 515d does not include documents corresponding to the presently active skill. In yet other embodiments, the encoded interaction data 515c, 515d may correspond to all skills indicated as enabled in a user profile associated with the dialog. Such enabled skills may or may not include the presently active skill.

The encoded interaction data 515c, 515d may represent out-of-skill intents. The encoded interaction data 515c, 515d may be determined before the dialog session begins. The encoded interaction data 515c, 515d may be updated periodically when updated interaction data 515c, 515d for the global level is available (e.g., when new skills are added to the system 120, when new document data (past user inputs, sample inputs, alternative representations, metrics data) is available, etc.). In some embodiments, the global index component 904 may also process encoded interaction data corresponding to a group of users that are similar to the user 5 (with respect to profile data, demographics, areas of interest, location, education background, employment, etc.).

A skill group index component 906 may process the encoded dialog data 435 and the encoded interaction data 515e corresponding to the skills group level to determine top K data 914 representing one or more potential intents corresponding to a user input in the dialog. The skill group index component 906 may perform a neural semantic search or kNN processing to determine one or more inputs (past user inputs, sample inputs, alternative representations) in the documents, from the encoded interaction data 515e, that are semantically similar to the encoded dialog data 435. The skill group index component 906 may be configured to minimize the cosine distance between the interaction data 515e and the encoded dialog data 435.

The encoded interaction data 515e may correspond to a group of skills. The group of skills may be skills that are similar to the presently active skill, in that the skills in the group may process similar intents and/or perform similar actions (output similar data). For example, if the presently active skill performs functionalities for reading a book, then the group of skills may include other skills that are also configured to read books. Before a dialog session begins, the system 120 may determine which skills perform similar functionalities, and may associate such skills to a category identifying the functionality they perform. A skill may belong to more than one category, in some embodiments. For example, a skill may be associated with a music category and a movie/TV show category.

The encoded interaction data 515e may be populated after a skill is invoked in the dialog session, and may correspond to the group of skills that perform functionalities similar to the invoked skill. The dialog manager 265/365 (or another component) may retrieve documents from the interaction data storage 410 corresponding to the group of skills, and may generate the encoded interaction data 515e as described in relation to FIG. 6. The encoded interaction data 515e may be updated/repopulated after another skill is invoked in the dialog session, so that the encoded interaction data 515e, at all time, corresponds to the group of skills that perform functionalities similar to the presently active skill. Thus, the encoded interaction data 515e may be determined after a dialog session begins and may be updated during the dialog session.

In another embodiment, the group of skills corresponding to a particular skill may be defined by a skill developer of the particular skill. In some cases, a skill developer may want to promote other skills to be used in conjunction with the particular skill. For example, a skill developer may indicate that a first taxi skill, a first restaurant skill, and a first food delivery skill are grouped together. In this case, the encoded interaction data 515e may correspond to the predefined group of skills associated with the presently active skill.

In some embodiments, the group of skills may be a combination of the predefined group of skills (provided by a skill developer) and skills that perform similar functionalities.

The top K data 910, 911, 912, 913 and 914 may include, in some embodiments, a different number of NLU hypotheses, and may not include the same number of NLU hypothesis. As such 'K' may be a different number/value for each of top K data 910, 911, 912, 913 and 914. A merger component 920 may process the top K data 910, 911, 912, 913 and 914 to determine final top K data 930 representing potential intents corresponding to the user input. The merger component 420 may perform merging, pruning, ranking and/or other combining techniques using the top K data 910, 911, 912, 913 and 914. The merger component 920, in some embodiments, may also use the context data 430 to determine the final top K data 930. For example, based on the device information (device capabilities), the merger component 920 may determine a potential intent that is capable of using the device capabilities. Thus, the final top K data 930 may include intents that are determined based on the different levels of interaction data described above. For example, the final top K data 930 may include within-skill intents and out-of-skill intents, and the final top K data 903 may also include within-skill intents and out-of-skill intents based on user-specific data (personalized for the user 5).

Figure 10:
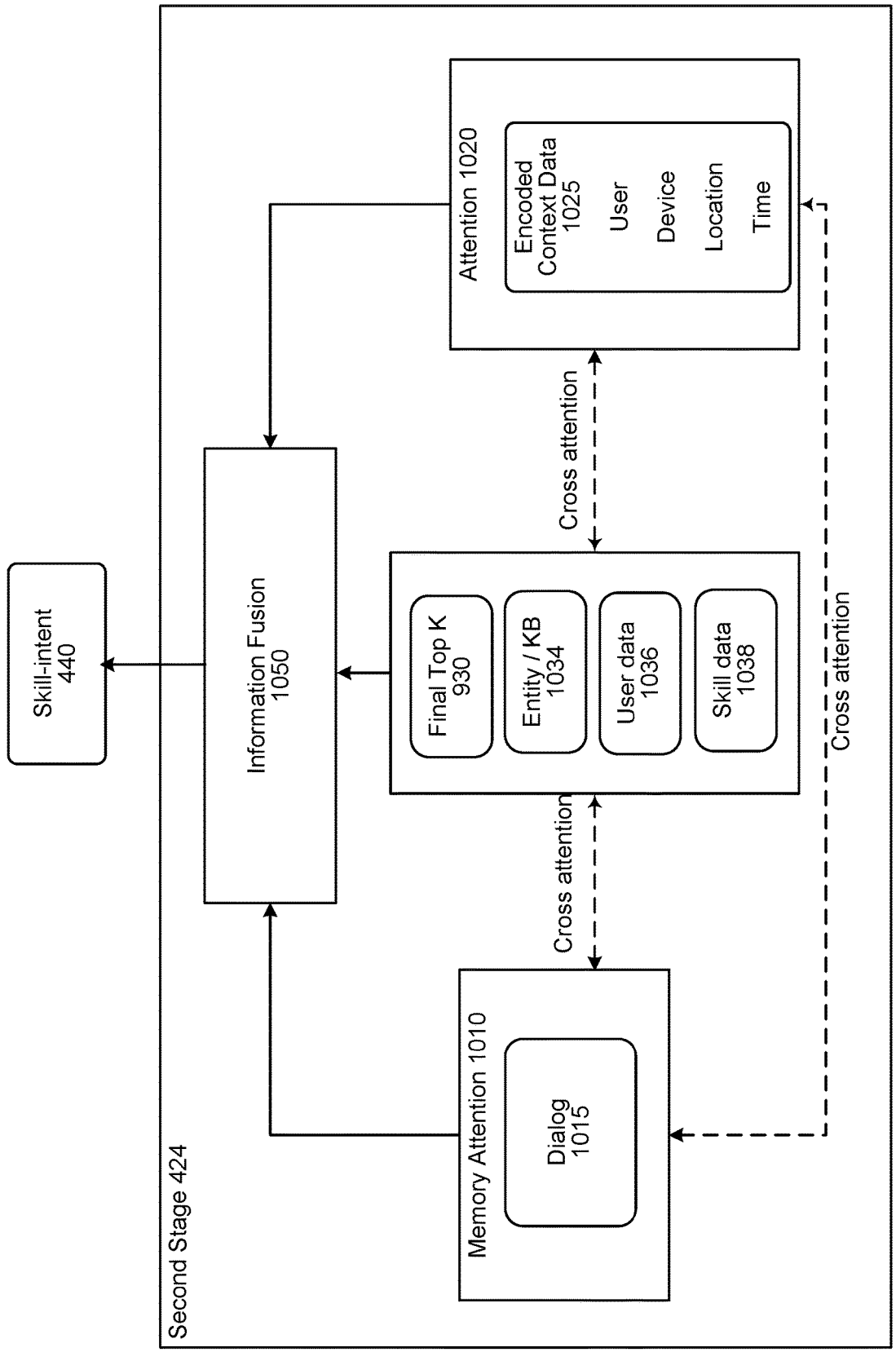
FIG. 10 is a conceptual diagram illustrating a second stage of processing to determine an intent corresponding to a user input in a dialog, according to embodiments of the present disclosure.

FIG. 10 is a conceptual diagram illustrating a second stage of processing, performed by the second stage component 424 (of the generation component 420), to determine an intent corresponding to user input in the dialog session, according to embodiments of the present disclosure. The second stage component 424 may process the final top K data 930 from the first stage component 422, along with dialog data 1015, encoded context data 1025 and other data. The second stage component 424, in this embodiment, may employ a ranking technique to rank the potential intents in the top K data 930 to determine the skill-intent data 440. The second stage component 424 may determine a score for each of the potential intents, where the score may be based on how relevant the potential intent based on processing of the below data.

To achieve this, the second stage component 424 may process the dialog data 1015 using a memory attention component 1010 that is configured to apply memory attention to the dialog data 1015. The dialog data 1015, which may be referred to as dialog memory, may be generated using multi-hop attention between the final top K data 930 from the first stage component 422, the entity/KB data 1034, and the encoded context data 1025.

The second stage component 424 may determine encoded context data 1025 by processing the context data 430 using an encoder. The encoded context data 1025 may include separate vectors/features corresponding to the various information included in the context data 1025. For example, a first vector may correspond to the user information included in the context data 430, a second vector may correspond to the device information included in the context data 430, a third vector may correspond to the location information included in the context data 430 and a fourth vector may correspond to the time information included in the context data 10K30. An attention component 1020 may process the encoded context data 1025 while applying an attention mechanism to focus on particular portions of the context data 430.

The second stage component 424, in addition to the final top K data 930, may also use entity/KB data 1034 representing entity information and knowledge base information related to the dialog. For example, if the dialog relates to booking a flight to a particular location, then the entity/KB data 1034 may include information on events at the particular location, weather information for the particular location, landmarks/attractions for the particular location, etc. The second stage component 424 may also use user data 1036 representing user preferences, enabled skills/applications, subscribed services, user profile information, etc. The second stage component 424 may also use skill data 1038 representing information corresponding to the skill(s) that was invoked during the dialog session. The skill data 1038 may include information on the capabilities of the skill(s) (e.g., which intents the skill(s) is able to process), skill rating, the number of times the skill(s) was invoked, etc.

The second stage component 424, in this embodiment, may perform cross attention between the dialog data 1015, the encoded context data 1025, the final top K data 930, the entity/KB data 1034, the user data 1036 and the skill data 1038. The second stage component 424 may perform self-attention between the final top K data 930, the entity/KB data 1034, user data 1036 and the skill data 1038. An information fusion component 1050 may aggregate/combine various information derived from the dialog data 1015, the final top K data 930, the entity/KB data 1034, the user data 1036, the skill data 1038, and the encoded context data 1025, based on the various attention associated with various portions of the information. The information fusion component 1050 may output the skill-intent data 440 representing an intent corresponding to the user input of the current turn in the dialog session. The information fusion component 1050 may be a neural network or other type of machine learning model configured to combine the foregoing data. The information fusion component 1050 may use one or more algorithms, statistical algorithms, regression models, etc.

Thus, the second stage component 424 uses self-attention and cross-attention mechanisms to discover important factors that help to determine an intent corresponding to the user input. The various encoded data are fed into the information fusion component 1050 to make a final decision with respect to a ranking of the potential intents determined by the first stage component 422. Training of the second stage component 424 may be focused on precision by adopting a margin ranking score at a dialog turn level.

Figure 11:
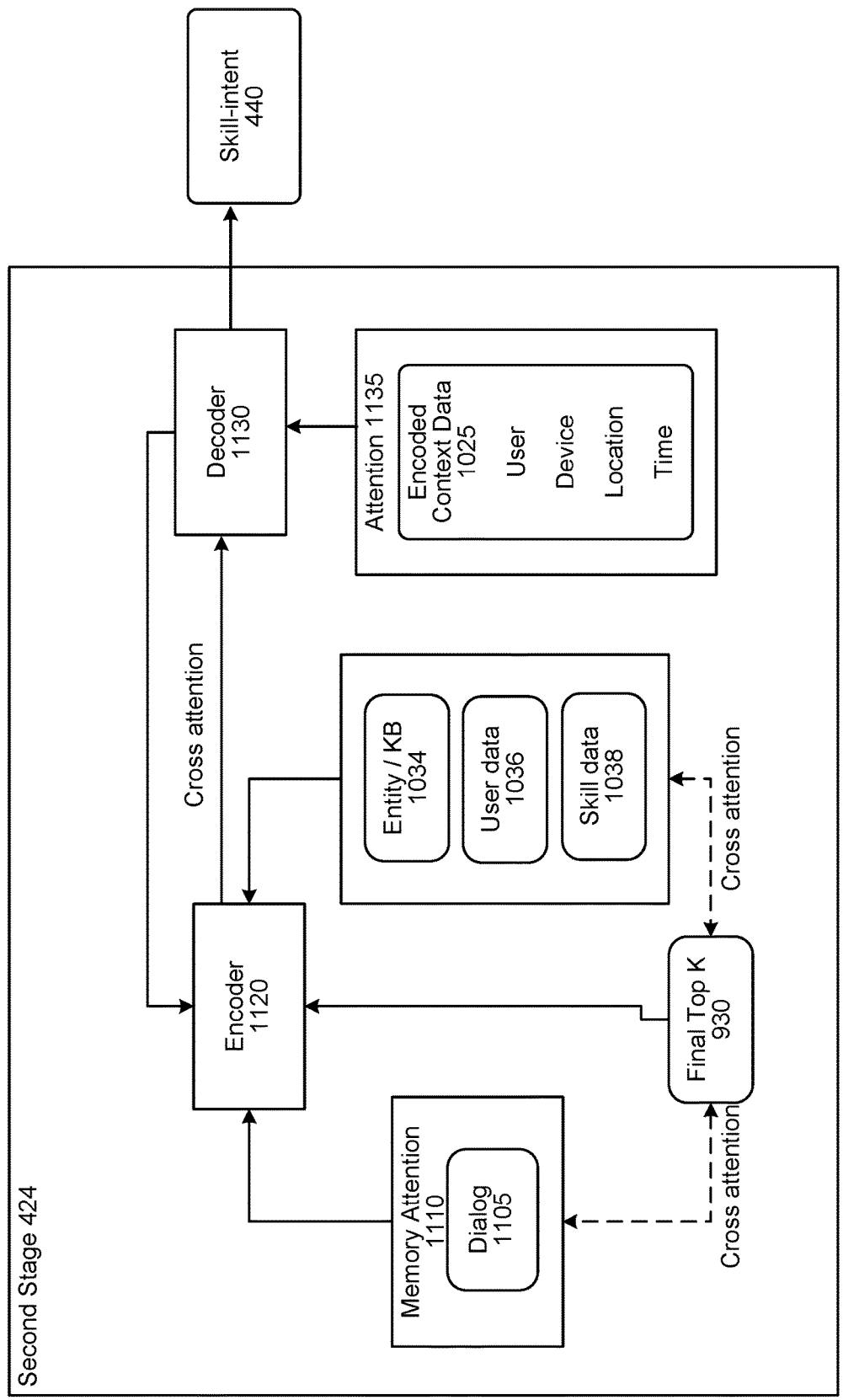
FIG. 11 is a conceptual diagram illustrating a second stage of processing to determine an intent corresponding to a user input in a dialog, according to other embodiments of the present disclosure.

FIG. 11 is a conceptual diagram illustrating a second stage of processing, performed by the second stage component 424, to determine an intent corresponding to a user input in a dialog session, according to other embodiments of the present disclosure. The second stage component 424 may process the final top K data 930 from the first stage component 422, along with dialog data 1105, encoded context data 1025 and other data. The second stage component 424, in this embodiment, may employ a generation technique to generate skill-intent data 440 based on processing of the foregoing data.

To achieve this, the second stage component 424 may process the dialog data 1105 using a memory attention component 1110 that is configured to apply memory attention to the dialog data 1105. The dialog data 1105, which may be referred to as dialog memory, may be generated using multi-hop attention between the final top K data 930 from the first stage component 422 and the entity/KB data 1034.

The second stage component 424, in this embodiment, may constrain the generation space (from which to generate the skill-intent data 440), using the final top K data 930, the entity/KB data 1034, the user data 1036, and the skill data 1038 as inputs to an encoder 1120. The encoder 1120 may adopt a hierarchical structure to extract a hidden representation of the aggregated/combined foregoing data, enabling a decoder 1130 to perform cross attention using the encoded context data 1025. The decoder 1130 may adopt a heterogeneous memory network to generate an intent using portions of the dialog data 1105, portions of the final top K data 930, and portions of the other data (1034, 1036, and 1038). The second stage component 424, in this embodiment, may be trained based on cross entropy loss.

The dialog manager 265/365 may further process the skill-intent data 440 to determine which user input to perform further processing with. The skill-intent data 440 may refer to or represent the document (e.g., 502 or 504) associated with the skill and intent determined by the second stage component 424. The document, as described above, may include past user inputs and alternative representations of the user inputs, along with metrics data, corresponding to the skill and the intent. Based on the number of times the past user inputs is received and resulted in a defect, in comparison to the number of times the alternative representations have been used and resulted in a defect, the dialog manager 265/365 may determine to select an alternative representation from the document to perform further processing. In other cases, the dialog manager 265/365 may select the past user input corresponding to the user input of the current turn to perform further processing. In this manner, the dialog manager 265/365 may select a skill-level alternative representation that the skill may be able to process to generate a desired response.

Figure 12:
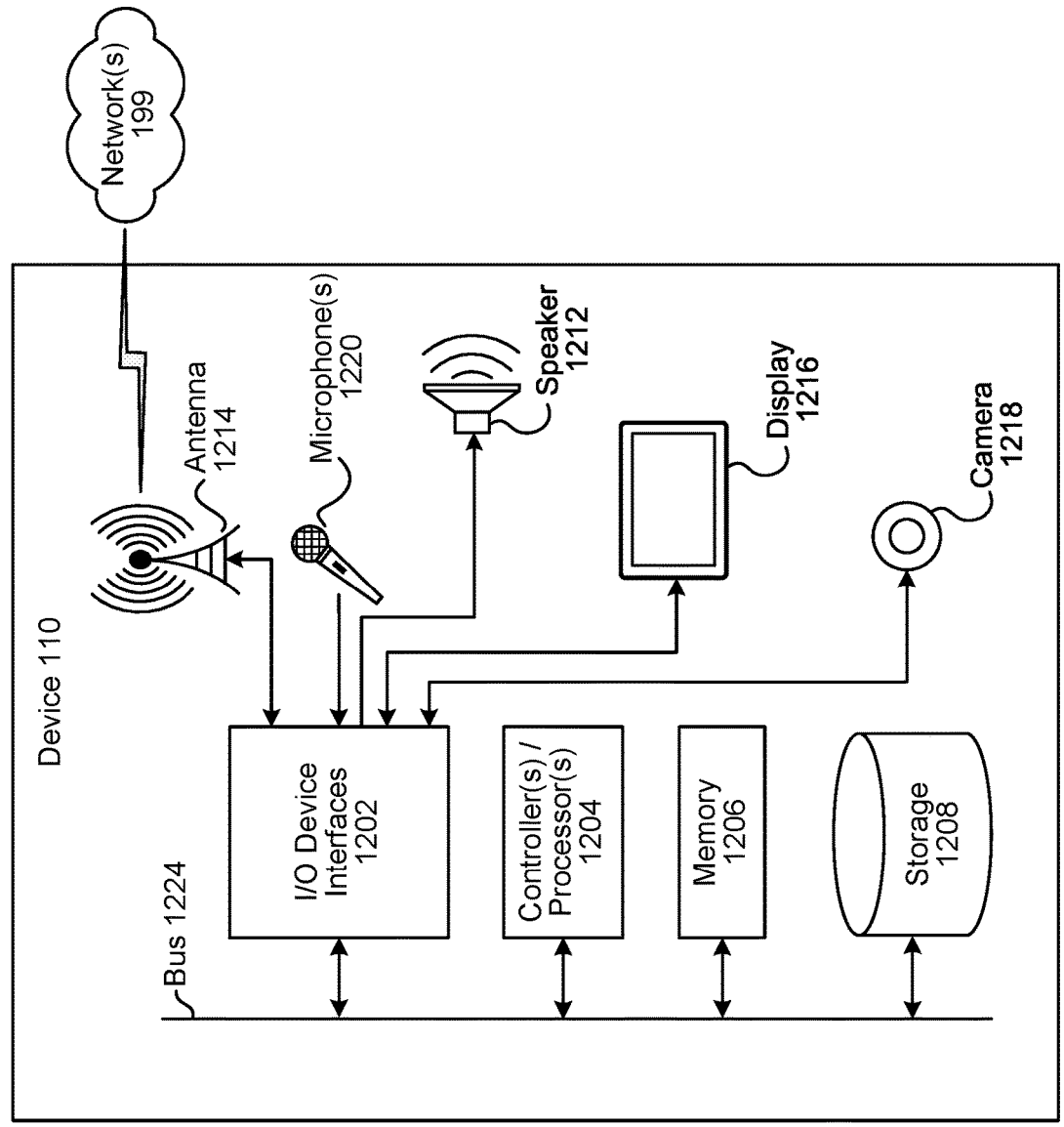
FIG. 12 is a block diagram conceptually illustrating example components of a device, according to embodiments of the present disclosure.
Figure 13:
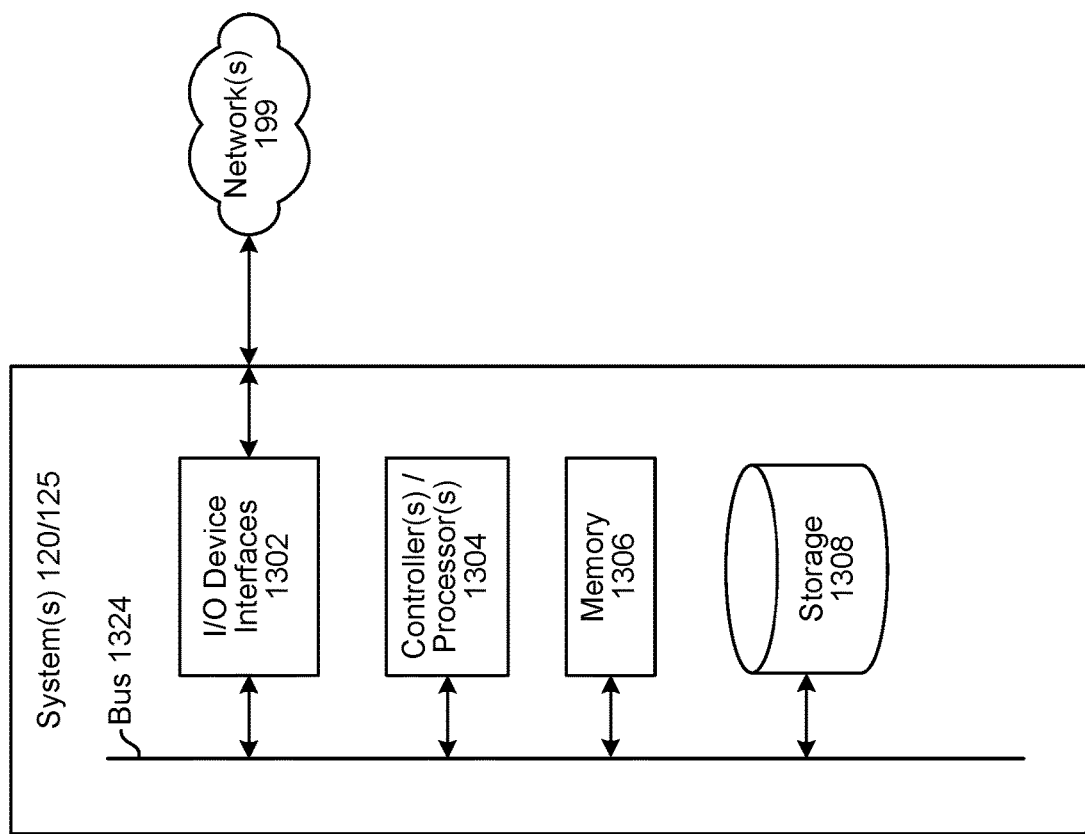
FIG. 13 is a block diagram conceptually illustrating example components of a system, according to embodiments of the present disclosure.

FIG. 12 is a block diagram conceptually illustrating example components of a device 110 according to the present disclosure. FIG. 13 is a block diagram conceptually illustrating example components of a system, such as the remote system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110, the remote system 120, and/or a skill system 125 may include their own dedicated processors, memory, and/or storage. Alternatively, one or more of the components of the device 110, the remote system 120, and/or a skill system 125 may utilize the I/O interfaces (1202/1302), processor(s) (1204/1304), memory (1206/1306), and/or storage (1208/1308) of the device(s) 110, remote system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill system 125, as described herein, are illustrative, and may be located as a stand-alone device or may be included, in whole or in part, as a component of a larger device or system.

Figure 14:
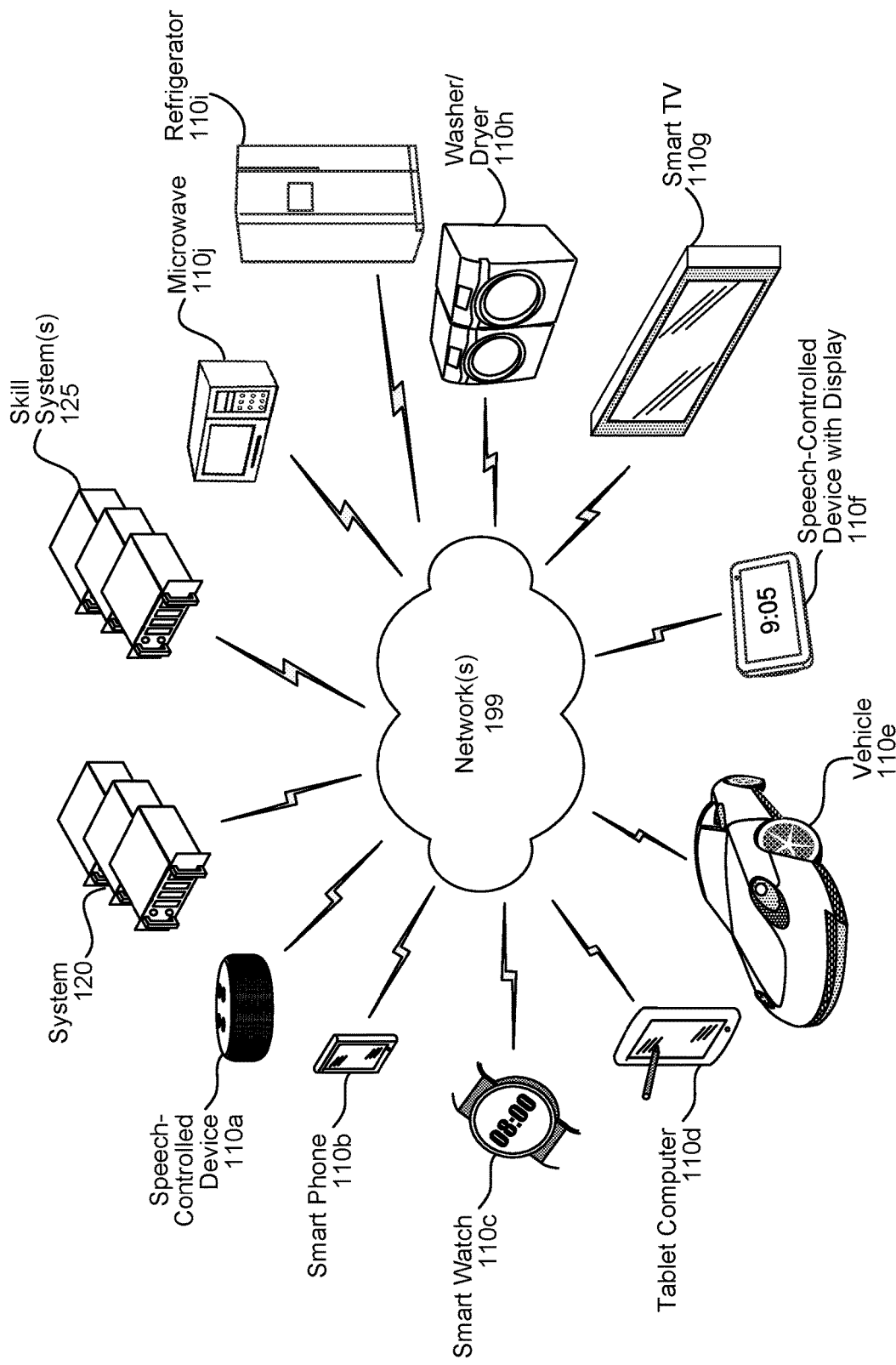
FIG. 14 illustrates an example of a computer network for use with the overall system, according to embodiments of the present disclosure.

As illustrated in FIG. 14, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first input data representing a first user input;
associating a first dialog session identifier with the first input data;
determining a first skill corresponding to the first input data;
determining, using the first skill, first output data responsive to the first user input;
sending the first output data to the first device;
after sending the first output data, receiving, from the first device, second input data representing a second user input;
based at least in part on the second user input corresponding to a previous input that resulted in an undesired system response, selecting first alternate data representing an alternative representation of the second user input;
associating the first dialog session identifier with the second input data and the first alternate data;
determining first interaction data corresponding to the first skill, the first interaction data including first data corresponding to a first intent, the first data including:
a first past user input,
a first sample input that results in a desired system response, and
a first alternative representation of the first past user input;
determining second interaction data corresponding to at least a second skill and a third skill, the second interaction data including second data corresponding to a second intent associated with the second skill, the second data including:
a second past user input,
a second sample input that results in a desired system response, and
a second alternative representation of the second past user input;
processing the second input data, the first data, and the second data to determine the first intent and the second intent potentially corresponding to the second input data;
determining context data corresponding to the first user input and the first alternate data, the context data representing at least one of device information associated with the first device, user profile data, location information, and time information;
based on the context data, selecting, from among the first intent and the second intent, the second intent as corresponding to the second input data;
determining, using the second skill, second output data responsive to the second input data, the second output data being generated using the second intent; and
sending the second output data to the first device.

2. The computer-implemented method of claim 1, further comprising:
determining, using a first encoder, first encoded data corresponding to the first past user input;
determining, using a second encoder, second encoded data corresponding to the first sample input;
determining, using a third encoder, third encoded data corresponding to the first alternative representation;
determining first encoded interaction data using the first encoded data, the second encoded data and the third encoded data;
determining second encoded interaction data based on the second data; and
determining encoded dialog data based on the first input data, the first output data and the second input data,
wherein processing the second input data, the first data and the second data comprises processing the encoded dialog data, the first encoded interaction data, and the second encoded interaction data.

3. The computer-implemented method of claim 1, further comprising:
receiving, from a second device, third input data representing a third user input;
associating a second dialog session identifier with the third input data;
determining the first skill corresponding to the third input data;
determining, using the first skill, third output data responsive to the third user input;
receiving, from the second device, fourth input data representing a fourth user input;
associating the second dialog session identifier with the fourth input data;
processing the fourth input data, the first data, and the second data;
determining that the first intent and the second intent potentially correspond to the fourth input data;

processing second context data corresponding to the third user input and the fourth user input;
selecting the first intent and the first alternative representation;
determining, using the first skill, fourth output data responsive to the first alternative representation; and
sending the fourth output data to the second device.

4. The computer-implemented method of claim 1, wherein receiving the first interaction data comprises receiving the first data including:
a first number of times the first past user input was received,
a second number of times the first past user input resulted in an undesired system response,
a third number of times the first alternative representation was used, and
a fourth number of times the first alternative representation was an undesired system response;
determining first encoded interaction data using the first past user input, the first sample input, the first alternative representation, the first number, the second number, the third number, and the fourth number; and
determining second encoded interaction data based at least in part on the second data,
wherein processing the second input data, the first data and the second data comprising processing the second input data, the first encoded interaction data and the second encoded interaction data.

5. A computer-implemented method comprising:
receiving first dialog data representing a first user input, a first system-generated response to the first user input, and a second user input;
based at least in part on the second user input corresponding to a previous input that resulted in an undesired system response, selecting first alternate data representing an alternative representation of the second user input;
determining a first skill corresponding to the first user input and the first system-generated response;
receiving first interaction data corresponding to the first skill, the first interaction data representing a first plurality of intents associated with the first skill;
receiving second interaction data corresponding to a second skill, the second interaction data representing a second plurality of intents associated with the second skill;
processing the first dialog data, the first interaction data and the second interaction data to determine a first intent corresponding to the first alternate data, the first intent selected from the second plurality of intents; and
determining, using the second skill, first output data responsive to the first alternate data.

6. The computer-implemented method of claim 5, wherein receiving the first interaction data comprises:
receiving the first interaction data including first data corresponding to a second intent associated with the first skill, the first data including:
a first past user input,
a first sample input that results in a desired system response, and
a first alternative representation of the first past user input; and
wherein receiving the second interaction data comprises:
receiving the second interaction data corresponding to at least the second skill and a third skill, the second interaction data including second data corresponding to the first intent associated with the second skill, the second data including:
a second past user input,
a second sample input that results in a desired system response, and
a second alternative representation of the second past user input.

7. The computer-implemented method of claim 6, wherein:
receiving the first interaction data comprises receiving the first data including:
a first number of times the first past user input was received,
a second number of times the first past user input resulted in an undesired system response,
a third number of times the first alternative representation was used, and
a fourth number of times the first alternative representation was an undesired system response; and
wherein the method further comprises:
determining first encoded interaction data using the first past user input, the first sample input, the first alternative representation, the first number, the second number, the third number, and the fourth number; and
determining second encoded interaction data based at least in part on the second data,
wherein the processing comprises processing the first dialog data, the first encoded interaction data and the second encoded interaction data.

8. The computer-implemented method of claim 5, further comprising:
determining a group of skills configured to perform functionalities similar to the first skill; and
receiving third interaction data corresponding to the group of skills, the third interaction data representing a third plurality of intents associated with the group of skills,
wherein the processing comprises processing the first dialog data, the first interaction data, the second interaction data, and the third interaction data.

9. The computer-implemented method of claim 5, further comprising:
determining encoded dialog data using the first dialog data;
determining first encoded interaction data using the first interaction data;
processing the encoded dialog data and the first encoded interaction data;
determining, from the first plurality of intents, a first set of potential intents corresponding to the first alternate data;
determining second encoded interaction data using the second interaction data;
processing the encoded dialog data and the second encoded interaction data;
determining, from the second plurality of intents, a second set of potential intents corresponding to the first alternate data;
using the first set and the second set, determining a third set of potential intents corresponding to the first alternate data; and
determining the first intent using the third set.

10. The computer-implemented method of claim 5, further comprising:
receiving second dialog data representing a third user input, a second system-generated response to the third user input, and a fourth user input;

determining a third skill corresponding to the third user input and the second system-generated response;

receiving third interaction data corresponding to the third skill, the third interaction data representing a third plurality of intents associated with the third skill;

processing the second dialog data, the third interaction data and the second interaction data;

determining a second intent corresponding to the fourth user input, the second intent selected from the third plurality of intents; and determining, using the third skill, second output data responsive to the fourth user input.

11. The computer-implemented method of claim 5, further comprising:

receiving context data corresponding to the first dialog data, the context data including at least one of device information, user profile data, time information, and location information;

processing the first dialog data, the first interaction data and the second interaction data to determine a set of potential intents corresponding to the first alternate data, the set of potential intents based on the first plurality of intents and the second plurality of intents; and processing the set of potential intents and the context data to determine the first intent.

12. The computer-implemented method of claim 5, wherein receiving the second interaction data comprises:

receiving the second interaction data corresponding to at least the second skill and a third skill, the second interaction data including second data corresponding to the first intent associated with the second skill, the second data including:

a first past user input, a first sample input that results in a desired system response, and a first alternative representation of the first past user input;

a first number of times the first past user input was received, a second number of times the first past user input resulted in an undesired response, a third number of times the first alternative representation was used, and a fourth number of times the first alternative representation was an undesired response;

based at least on the first number, the second number, the third number, and the fourth number, selecting the first alternative representation corresponding to the first intent; and determining the first output data using the first alternative representation.

13. A system comprising:

at least one processor; and at least one memory including instructions that, when executed by the at least one processor, cause the system to:

receive first dialog data representing a first user input, a first system-generated response to the first user input, and a second user input;

based at least in part on the second user input corresponding to a previous input that resulted in an undesired system response, select first alternate data representing an alternative representation of the second user input, determine a first skill corresponding to the first user input and the first system-generated response;

receive first interaction data corresponding to the first skill, the first interaction data representing a first plurality of intents associated with the first skill;

receive second interaction data corresponding to a second skill, the second interaction data representing a second plurality of intents associated with the second skill;

process the first dialog data, the first interaction data and the second interaction data to determine a first intent corresponding to the first alternate data, the first intent selected from the second plurality of intents; and determine, using the second skill, first output data responsive to the first alternate data.

14. The system of claim 13, wherein the first interaction data includes first data corresponding to a second intent associated with the first skill, the first data including:

a first past user input, a first sample input that results in a desired system response, and a first alternative representation of the first past user input; and wherein the second interaction data includes second data corresponding to the first intent associated with the second skill, the second data including:

a second past user input, a second sample input that results in a desired system response, and a second alternative representation of the second past user input.

15. The system of claim 14, wherein the first data comprises:

a first number of times the first past user input was received, a second number of times the first past user input resulted in an undesired system response, a third number of times the first alternative representation was used, and a fourth number of times the first alternative representation was an undesired system response; and wherein the instructions that, when executed by the at least one processor, further cause the system to:

determine first encoded interaction data using the first past user input, the first sample input, the first alternative representation, the first number, the second number, the third number, and the fourth number;

determine second encoded interaction data based at least in part on the second data; and process comprises processing the first dialog data, the first encoded interaction data and the second encoded interaction data.

16. The system of claim 13, wherein the instructions that, when executed by the at least one processor, further cause the system to:

determine a group of skills configured to perform functionalities similar to the first skill;

receive third interaction data corresponding to the group of skills, the third interaction data representing a third plurality of intents associated with the group of skills; and process the first dialog data, the first interaction data, the second interaction data and the third interaction data.

17. The system of claim 13, wherein the instructions that, when executed by the at least one processor, further cause the system to:
- determine encoded dialog data using the first dialog data;
- determine first encoded interaction data using the first interaction data;
- process the encoded dialog data and the first encoded interaction data;
- determine, from the first plurality of intents, a first set of potential intents corresponding to the first alternate data;
- determine second encoded interaction data using the second interaction data;
- process the encoded dialog data and the second encoded interaction data;
- determine, from the second plurality of intents, a second set of potential intents corresponding to the first alternate data;
- using the first set and the second set, determining a third set of potential intents corresponding to the first alternate data; and
- determine the first intent using the third set.

18. The system of claim 13, wherein the instructions that, when executed by the at least one processor, further cause the system to:
- receive second dialog data representing a third user input, a second system-generated response to the third user input, and a fourth user input;
- determine a third skill corresponding to the third user input and the second system-generated response;
- receive third interaction data corresponding to the third skill, the third interaction data representing a third plurality of intents associated with the third skill;
- process the second dialog data, the third interaction data and the second interaction data;
- determine a second intent corresponding to the fourth user input, the second intent selected from the third plurality of intents; and
- determine, using the third skill, second output data responsive to the fourth user input.

19. The system of claim 13, wherein the instructions that, when executed by the at least one processor, further cause the system to:
- receive context data corresponding to the first dialog data, the context data including at least one of device information, user profile data, time information, and location information;
- process the first dialog data, the first interaction data and the second interaction data to determine a set of potential intents corresponding to the first alternate data, the set based on the first plurality of intents and the second plurality of intents; and
- process the set of potential intents and the context data to determine the first intent.

20. The system of claim 13, wherein the instructions that, when executed by the at least one processor, further cause the system to:
- receive the second interaction data corresponding to at least the second skill and a third skill, the second interaction data including second data corresponding to the first intent associated with the second skill, the second data including:
  - a first past user input,
  - a first sample input that results in a desired system response, and
  - a first alternative representation of the first past user input;
  - a first number of times the first past user input was received,
  - a second number of times the first past user input resulted in an undesired response,
  - a third number of times the first alternative representation was used, and
  - a fourth number of times the first alternative representation was an undesired response;
- based at least on the first number, the second number, the third number, and the fourth number, select the first alternative representation corresponding to the first intent; and
- determine the first output data using the first alternative representation.

* * * * *